United States Patent
Nagato et al.

(10) Patent No.: US 9,710,877 B2
(45) Date of Patent: Jul. 18, 2017

(54) IMAGE PROCESSING APPARATUS AND FEATURE DETECTION METHOD

(71) Applicant: FUJITSU LIMITED, Kawasaki-shi, Kanagawa (JP)

(72) Inventors: Tsuyoshi Nagato, Isehara (JP); Tetsuo Koezuka, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/744,607

(22) Filed: Jun. 19, 2015

(65) Prior Publication Data

US 2015/0287160 A1 Oct. 8, 2015

Related U.S. Application Data

(63) Continuation of application No. PCT/JP2013/084785, filed on Dec. 26, 2013.

(30) Foreign Application Priority Data

Dec. 28, 2012 (JP) .................. 2012-288440

(51) Int. Cl.
*G06T 1/20* (2006.01)
*G06T 3/00* (2006.01)
(Continued)

(52) U.S. Cl.
CPC ............ *G06T 1/20* (2013.01); *G06K 9/4623* (2013.01); *G06K 9/4638* (2013.01);
(Continued)

(58) Field of Classification Search
CPC .. G06K 9/6229; G06K 9/4638; G06K 9/4623; G06K 9/6201; G06T 7/0004;
(Continued)

(56) References Cited

U.S. PATENT DOCUMENTS 5,140,530 A * 8/1992 Guha .................. G06N 3/126
706/13
5,245,696 A * 9/1993 Stork .................. G06K 9/4628
706/13
(Continued)

FOREIGN PATENT DOCUMENTS

JP 09-330406 A 12/1997
JP 11-213127 A 8/1999
(Continued)

OTHER PUBLICATIONS

Non-Patent Literature, IEEE 2006, Durga Prasad et. al: Genetic Programming for Simultaneous Feature Selection and Classifier Design.*

(Continued)

*Primary Examiner* — Sean Conner
*Assistant Examiner* — Pinalben Patel
(74) *Attorney, Agent, or Firm* — Fujitsu Patent Center

(57) ABSTRACT

An image processing apparatus is disclosed. A processor performs a process that arranges multiple image filters in a tree structure and acquires features of multiple input images captured in different environments. A storage part stores a filter table that maintains information concerning the multiple image filters. In the process, an image filter having a different type for each of layers, in which multiple image processes are hierarchized, is selected from the filter table. A population, which includes the multiple image filters in the tree structure, is generated.

12 Claims, 25 Drawing Sheets

(51) Int. Cl.
*G06T 7/00* (2017.01)
*G06K 9/62* (2006.01)
*G06K 9/46* (2006.01)

(52) U.S. Cl.
CPC ......... *G06K 9/6201* (2013.01); *G06K 9/6229* (2013.01); *G06T 3/00* (2013.01); *G06T 7/0004* (2013.01); *G06T 2207/20072* (2013.01); *G06T 2207/30164* (2013.01)

(58) Field of Classification Search
CPC . G06T 2207/20072; G06T 2207/30164; G06T 1/20; G06T 3/00
See application file for complete search history.

(56) References Cited

U.S. PATENT DOCUMENTS

| | | | | |
|---|---|---|---|---|
| 5,343,554 | A * | 8/1994 | Koza | G06N 3/126 706/13 |
| 6,400,849 | B1 * | 6/2002 | Lee | G06T 5/20 382/260 |
| 6,810,118 | B1 * | 10/2004 | Martin | H04Q 3/0054 379/207.02 |
| 6,813,615 | B1 * | 11/2004 | Colasanti | G06F 19/3443 706/45 |
| 8,305,436 | B2 * | 11/2012 | Fujisawa | G01M 17/027 348/92 |
| 9,250,931 | B2 * | 2/2016 | Spitzer | G06F 9/44505 |
| 2006/0265145 | A1 * | 11/2006 | Huet | G01R 31/2846 702/35 |
| 2008/0069399 | A1 * | 3/2008 | Nagao | G06T 7/2006 382/103 |
| 2009/0106176 | A1 * | 4/2009 | Kobayashi | G06F 17/30256 706/13 |
| 2010/0278425 | A1 * | 11/2010 | Takemoto | G06T 7/0079 382/173 |
| 2011/0038515 | A1 * | 2/2011 | Jacquin | A61B 5/0476 382/128 |
| 2016/0300351 | A1 * | 10/2016 | Gazit | G06T 7/0012 |

FOREIGN PATENT DOCUMENTS

| | | |
|---|---|---|
| JP | 2006-048370 A | 2/2006 |
| JP | 2007-087055 A | 4/2007 |
| JP | 2009-064162 A | 3/2009 |

OTHER PUBLICATIONS

International Search Report and Partial Translation of Written Opinion of the International Searching Authority (Form PCT/ISA/210 & Form PCT/ISA/237), mailed in connection with PCT/JP2013/084785 and mailed Mar. 11, 2014 (8 pages).

Atsushi Shiromaru et al.,"Automatic Design of Image Recognition Algorithms using Genetic Programming", Technical Report of IEICE,PRMU 2001-112 (Oct. 2001), Oct. 12, 2001 (Oct. 12, 2001),vol. 101, No. 363, pp. 21 to 28 cited in ISR for PCT/JP2013/084785.

Shinichi Shirakawa et al., "Automatic Construction of Image Classification Algorithms Based on Genetic Image Network", [online], Transactions of the Japanese Society for Artificial Intelligence, Jan. 26, 2010 (Jan. 26, 2010), vol. 25 (2010), No. 2, pp. 262 to 271, [retrieval date Feb. 28, 2014 (Feb. 28, 2014)] cited in ISR for PCT/JP2013/084785.

Shinya Aoki et al., "ACTIT: Automatic Construction of Tree-structural Image Transformations", [online], The Journal of the Institute of Image Information and Television Engineers, Jun. 20, 1999 (Jun. 20, 1999),vol. 53, No. 6, pp. 888 to 894, [retrieval date Feb. 28, 2014 (Feb. 28, 2014)] cited in ISR for PCT/JP2013/084785.

JPOA—Japanese Office Action mailed on Jun. 21, 2016 issued with respect to the corresponding Japanese Patent Application No. 2014-554520, with partial translation.

* cited by examiner

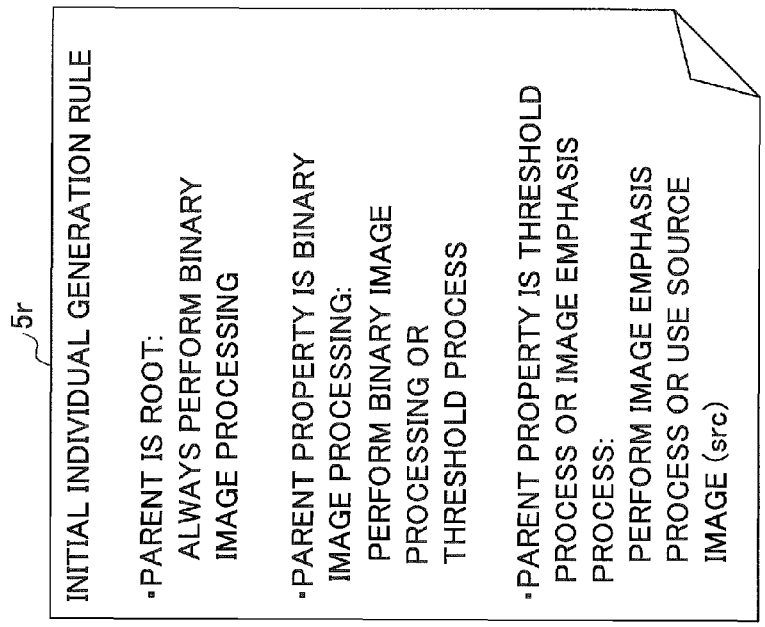
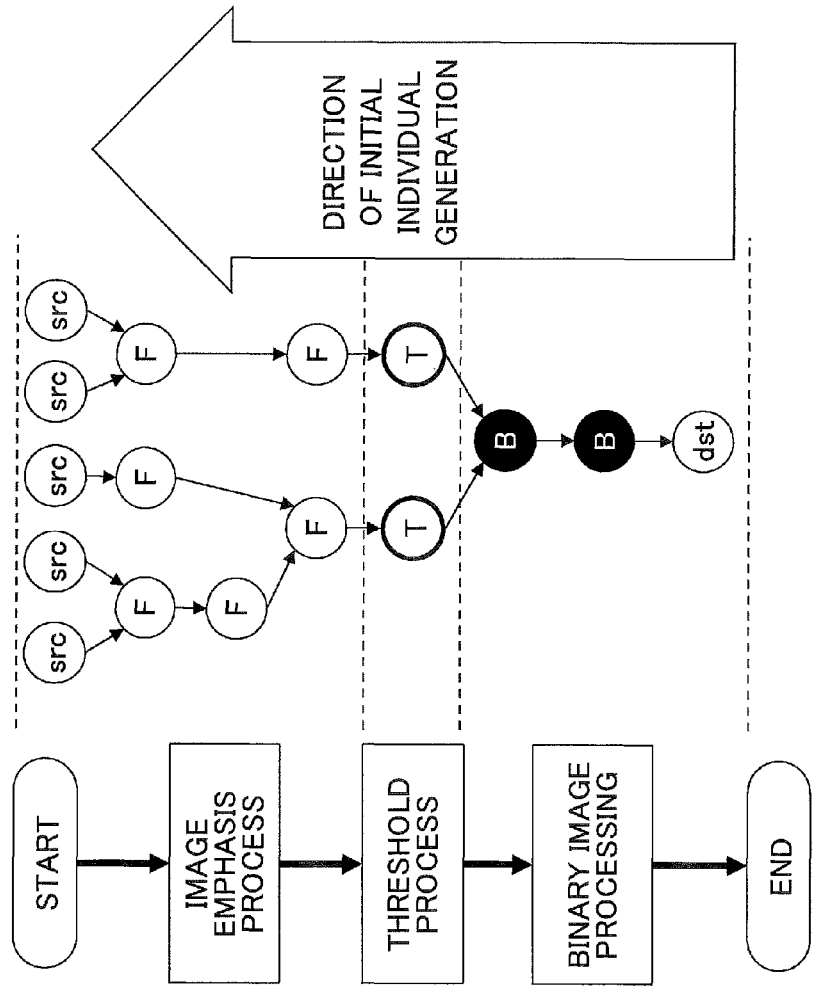

FIG.8A

| PROPERTY | DEPTH | PROCESS NAME | IDENTIFICATION INFORMATION | INPUT | OUTPUT |
|---|---|---|---|---|---|
| IMAGE EMPHASIS PROCESS | ≦5 | SMOOTHING (3x3) | Fsm3 | 1 | 1 |
| IMAGE EMPHASIS PROCESS | ≦5 | SMOOTHING (9x9) | Fsm9 | 1 | 1 |
| IMAGE EMPHASIS PROCESS | ≦5 | SMOOTHING (27x27) | Fsm27 | 1 | 1 |
| IMAGE EMPHASIS PROCESS | ≦5 | SMOOTHING (81x81) | Fsm81 | 1 | 1 |
| IMAGE EMPHASIS PROCESS | ≦5 | Sobel PROCESS (X-DIRECTION 3 pixels) | FsoX3 | 1 | 1 |
| IMAGE EMPHASIS PROCESS | ≦5 | Sobel PROCESS (X-DIRECTION 7 pixels) | FsoX7 | 1 | 1 |
| IMAGE EMPHASIS PROCESS | ≦5 | Sobel PROCESS (Y-DIRECTION 3 pixels) | FsoY3 | 1 | 1 |
| IMAGE EMPHASIS PROCESS | ≦5 | Sobel PROCESS (Y-DIRECTION 7 pixels) | FsoY7 | 1 | 1 |
| IMAGE EMPHASIS PROCESS | ≦5 | Laplacian PROCESS (3x3) | Flap3 | 1 | 1 |
| IMAGE EMPHASIS PROCESS | ≦5 | Laplacian PROCESS (7x7) | Flap7 | 1 | 1 |
| IMAGE EMPHASIS PROCESS | ≦5 | GRADATION INVERSION | Finv | 1 | 1 |
| IMAGE EMPHASIS PROCESS | ≦5 | DIFFERENCE | Fsub | 2 | 1 |
| IMAGE EMPHASIS PROCESS | ≦5 | SUM | Fadd | 2 | 1 |
| IMAGE EMPHASIS PROCESS | ≦5 | ABSOLUTE VALUE OF DIFFERENCE | Fdiff | 2 | 1 |

FIG.8B

| PROPERTY | DEPTH | PROCESS NAME | IDENTIFICATION INFORMATION | INPUT | OUTPUT |
|---|---|---|---|---|---|
| THRESHOLD PROCESS | ≦6 | THRESHOLD 64 | T64 | 1 | 1 |
| THRESHOLD PROCESS | ≦6 | THRESHOLD 128 | T128 | 1 | 1 |
| THRESHOLD PROCESS | ≦6 | THRESHOLD 192 | T192 | 1 | 1 |
| THRESHOLD PROCESS | ≦6 | THRESHOLD (OTSU'S METHOD) | Totsu | 1 | 1 |
| THRESHOLD PROCESS | ≦6 | Canny EDGE (3x3) | Tcan3 | 1 | 1 |
| THRESHOLD PROCESS | ≦6 | Canny EDGE (7x7) | Tcan7 | 1 | 1 |
| BINARY IMAGE PROCESSING | ≦20 | OPENING (CIRCLE) | BopC | 1 | 1 |
| BINARY IMAGE PROCESSING | ≦20 | OPENING (RECTANGLE) | BopR | 1 | 1 |
| BINARY IMAGE PROCESSING | ≦20 | EXPANSION PROCESS | Bdil | 1 | 1 |
| BINARY IMAGE PROCESSING | ≦20 | CONTRACTION PROCESS | Bero | 1 | 1 |
| BINARY IMAGE PROCESSING | ≦20 | Hough LINE DETECTION | Blin | 1 | 1 |
| BINARY IMAGE PROCESSING | ≦20 | AND PROCESS | Band | 2 | 1 |
| BINARY IMAGE PROCESSING | ≦20 | OR PROCESS | Bor | 2 | 1 |
| BINARY IMAGE PROCESSING | ≦20 | NOT PROCESS | Bnot | 1 | 1 |
| BINARY IMAGE PROCESSING | ≦20 | NOT PROCESSED | Bnc | 1 | 1 |
| SOURCE IMAGE | - | SOURCE IMAGE | src | - | - |

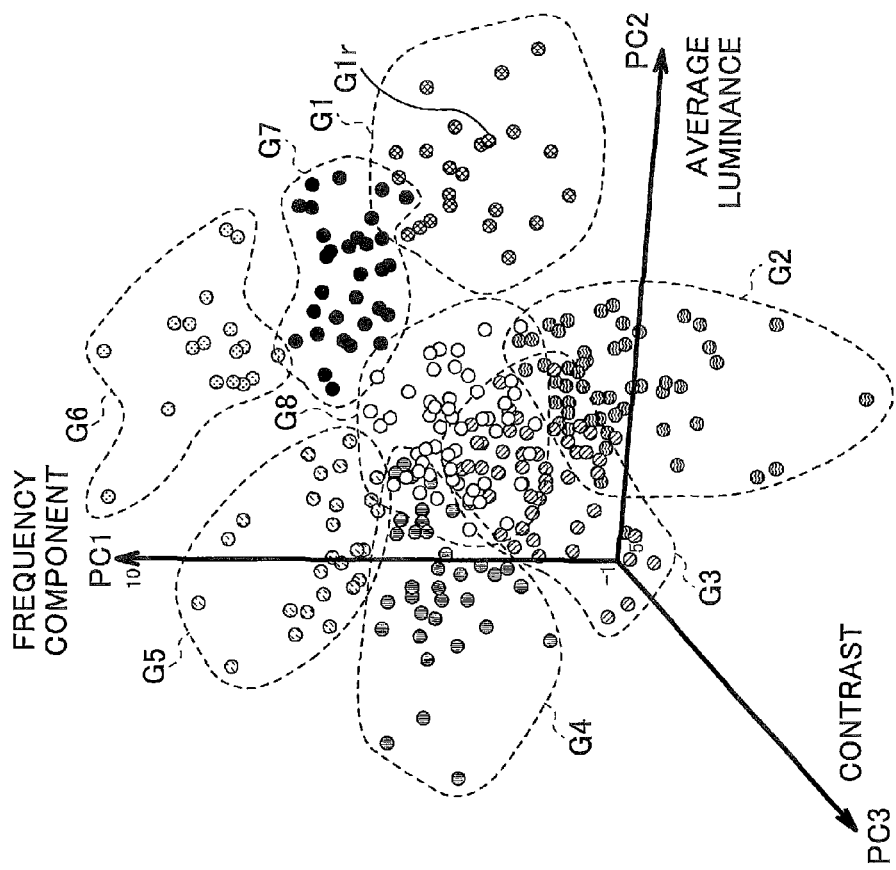

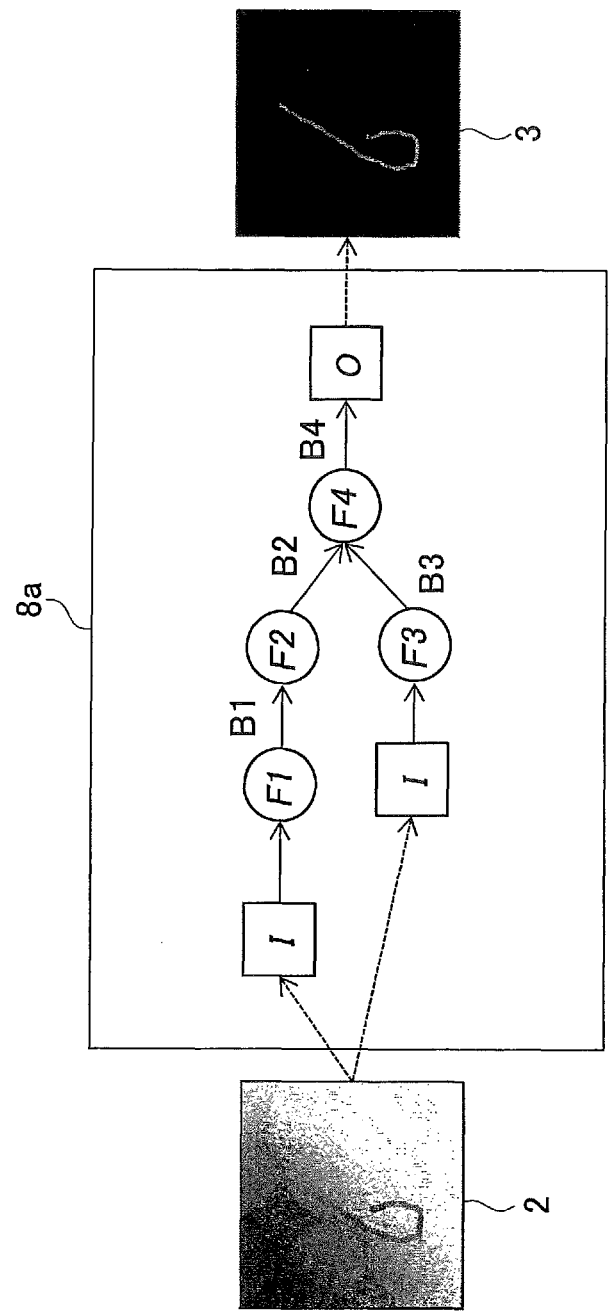

IMAGE PROCESSING APPARATUS AND FEATURE DETECTION METHOD

CROSS-REFERENCE TO RELATED APPLICATIONS

This application is a U.S. continuation application filed under 35 USC 111(a) claiming benefit under 35 USC 120 and 365(c) of PCT application PCT/JP2013/084785, filed on Dec. 26, 2013, which claims priority to Japanese Patent Application Ser. No. 2012-288440, filed in Japan on Dec. 28, 2012. The foregoing applications are hereby incorporated herein by reference.

FIELD

The embodiment discussed herein is related to an image processing apparatus and a feature detection method.

BACKGROUND

Conventionally, in an appearance inspection, an appearance of a manufacture is imaged by using an imaging device such as a camera, and presence or absence of a defect is determined. Specially, in a Factory Automation (FA) field, noise, a shadow, a luminance change, and the like occur in an image depending on an imaging environment. Hence, a robust process is desired with respect to an environmental change for an image processing algorithm which finds a defective part. While operating the appearance inspection apparatus, the environmental change may be caused when a target to inspect is changed or the appearance inspection apparatus is improved. In this case, the image processing algorithm is re-developed. In order to reduce its workload, it is desired to easily re-develop the image processing method.

As one of methods for automatically generating an image processing algorithm, Automatic Construction of Tree-structural Image Transformation (ACTIT) has been proposed in which genetic programming is adapted to an image processing. In this method, it is considered that an image processing scheme forms a tree structure. An input image and an image of a process result to be a target (target image) are prepared. By using the genetic programming, the tree structure is optimized for an image processing filter group which has higher fitness to a target process.

[Non-Patent Document 1]
ACTIT: Automatic Construction of Tree-structural Image Transformation, the Journal of the Institute of Image Information and Television Engineers 53, 6, pp 888-894, 1999

In the ACTIT as related art, in order to represent a complicated process by the tree structure, types of image filters which correspond to base of a filter structure become wider, and a depth of the tree structure become greater. Due to a wider range of types of the image filters and a greater depth of the tree structure, combinations of the filter structures exponentially become greater. That is, a search range becomes wider, and a performance of searching for a target image processing is degraded.

SUMMARY

According to one aspect of the embodiment, there is provided an image processing apparatus, including a processor configured to perform a process that arranges multiple image filters in a tree structure and acquires features of multiple input images captured in different environments; and a storage part configured to store a filter table that maintains information concerning the multiple image filters, wherein the process includes selecting an image filter having a different type for each of layers in which multiple image processes are hierarchized, from the filter table; and generating a population that includes the multiple image filters in the tree structure.

According to another aspect of the embodiment, there is provided an image processing apparatus for executing a process program, in which multiple filters are formed in a tree structure, with respect to multiple images captured by an imaging device, the apparatus including a storage part; and a processor configured to perform a process, wherein the process includes selecting learning data based on feature amounts concerning the multiple images at an initial learning stage; and generating the process program through learning by employing genetic programming.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6A and FIG. 6B are diagrams for explaining an initial individual generation process in the first embodiment;

FIG. 8A and FIG. 8B are diagrams illustrating a data structure example of a filter table in the first embodiment;

FIG. 20A and FIG. 20B are diagrams illustrating examples of initial feature information and clustering in the second embodiment;

FIG. 21 is a diagram illustrating an example of the image processing algorithm updated at a first learning stage in the second embodiment;

DESCRIPTION OF EMBODIMENTS

In the following, embodiments of the present invention will be described with reference to the accompanying drawings.

First Embodiment

Figure 1:
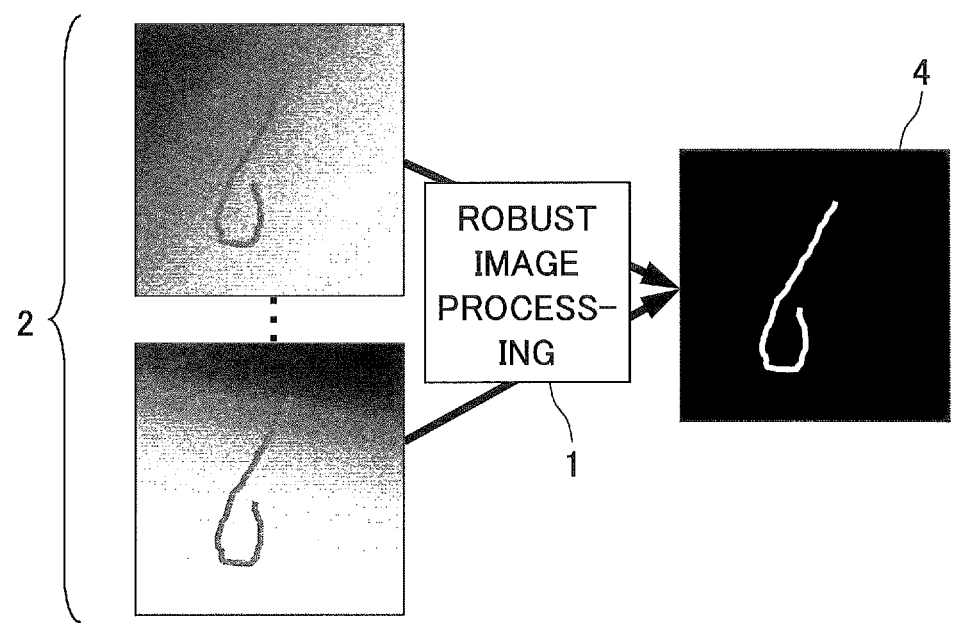
FIG. 1 is a diagram for explaining robust image processing with respect to an environmental change.

FIG. 1 is a diagram for explaining robust image processing against an environmental change. In FIG. 1, a target image 4 is acquired by performing robust image processing 1 with respect to multiple input images 2 in which the environmental change is different depending on luminance, a location, and the like. That is, the robust image processing 1 conducts an optimal process with respect to the multiple input images 2 having different environmental changes. In a Factory Automation (FA), the target image 4 may correspond to an image used to find a defective part (that is, to extract an image portion of the defective part) of a manufacture. The defective part is regarded as a feature portion to find.

Figure 2:
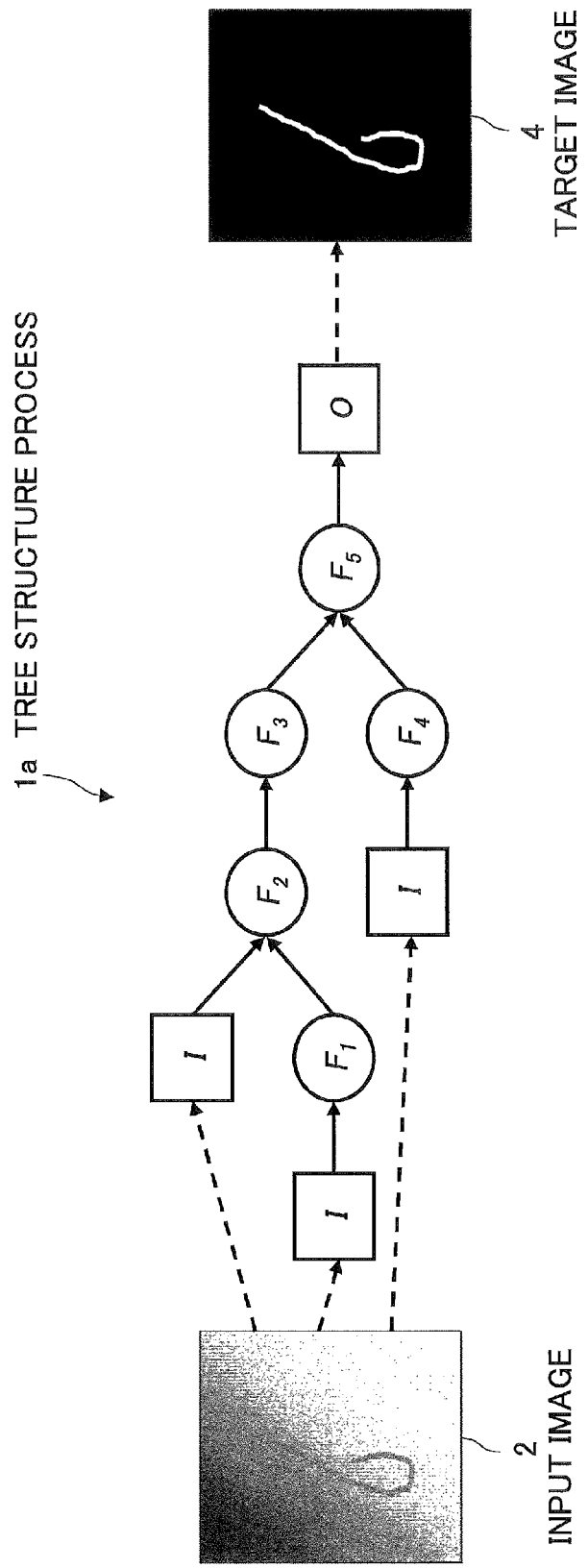
FIG. 2 is a diagram illustrating an example of an image process algorithm of a tree structure.

In the robust image processing 1, when it is considered that an image processing scheme forms a tree structure by referring to ACTIT (refer to Non-Patent Document 1), the image processing scheme may have a configuration as illustrated in FIG. 2. FIG. 2 is a diagram illustrating an example of an image processing algorithm of the tree structure. As illustrated in FIG. 2, image processing filters F1, F2, F3, F4, and F5 are formed for the multiple input images 2, and form a tree-structural process 1a in order to acquire the target image 4. In the tree-structural process 1a, optimization is performed by genetic programming.

In this example in FIG. 2, the image processing filters F2, F3, and F5 are applied for the input image 2 at top to acquire the target image 4. The image processing filters F1, F2, F3, and F5 are applied for the input image 2 at middle to acquire the target image 4. The image processing filters F4 and F5 are applied for the input image 2 at bottom to acquire the target image 4. As described above, the image processing algorithm represents the tree structure in which a root is the target image 4.

Figure 3A:
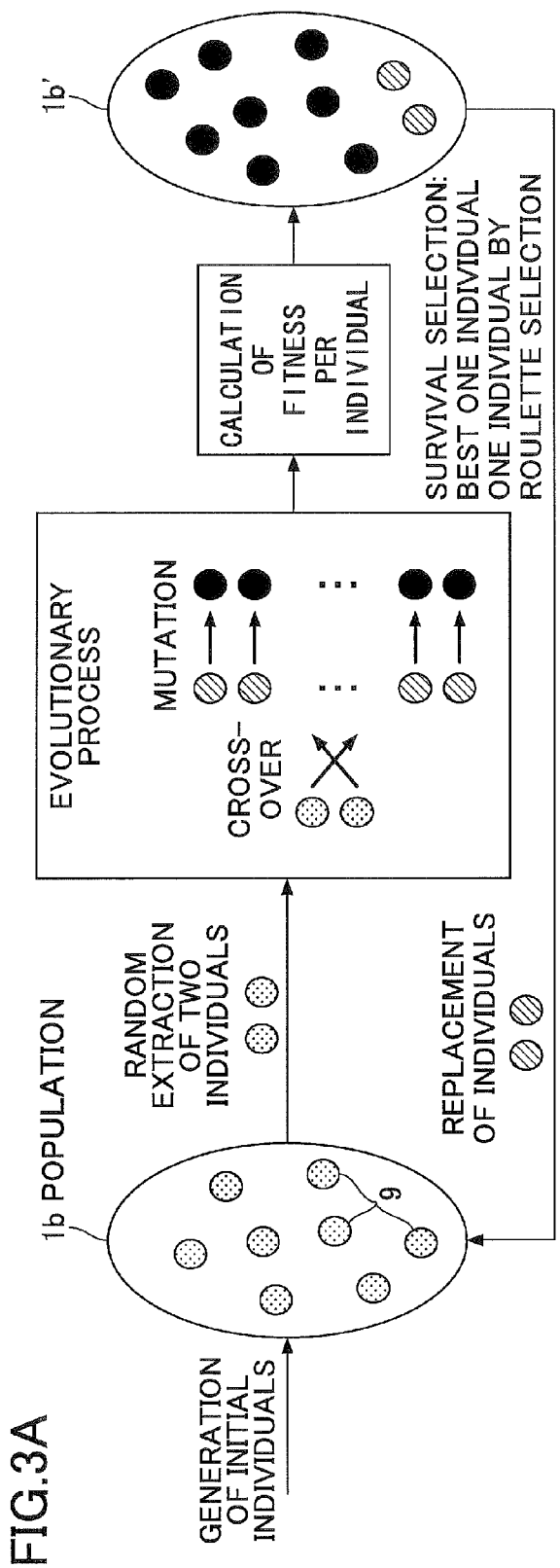
FIG. 3A and FIG. 3B are diagrams for schematically explaining a feature detection process in a first embodiment.
Figure 3B:
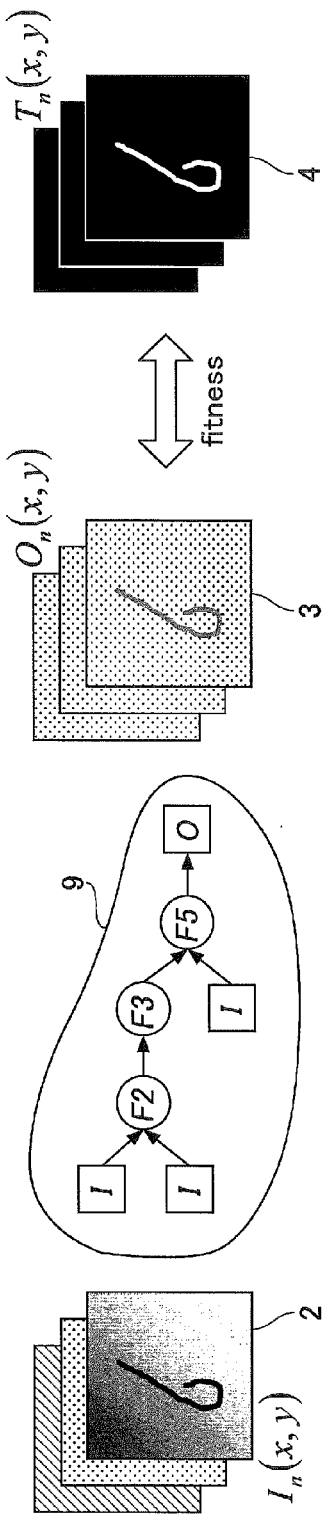

FIG. 3A and FIG. 3B are diagrams for schematically explaining a feature detection process in a first embodiment. Referring to FIG. 3A, in an optimization of the genetic programming, a crossover process and a mutation process are conducted with respect to multiple initial individuals in a population $1b$ in which each individual 9 represents an image processing filter group formed by the tree structure, and a new population $1b'$ is generated. The population $1b$ is replaced with the new population $1b'$ having higher fitness, and the population $1b$ is updated. That is, the population $1b'$ which is optimized is searched for. In detail, two individuals 9 may be selected as crossover subjects from the population $1b$. Each of two individuals 9 corresponds to the image processing filter group formed by the tree structure. Also, in each of the individuals 9, one image processing filter (corresponding to a node) may be replaced with another image processing filter by the mutation process. By repeating these processes, the population $1b$ is optimized.

Referring to FIG. 3B, fitness is calculated by using respective individuals 9 of the population $1b$ with respect to multiple captured images (the input images 2), and comparing output images 3 as process results with the target images 4 regarded as teacher data.

By preparing pairs of the captured images as the input images 2 and the target images 4 used as respective targets for the process results, it is possible to automatically construct an optimized image processing algorithm. Moreover, by preparing respective sets of the input images 2 and the target images 4 for multiple different environments, it is possible to automatically construct a robust image processing algorithm.

Figure 4:
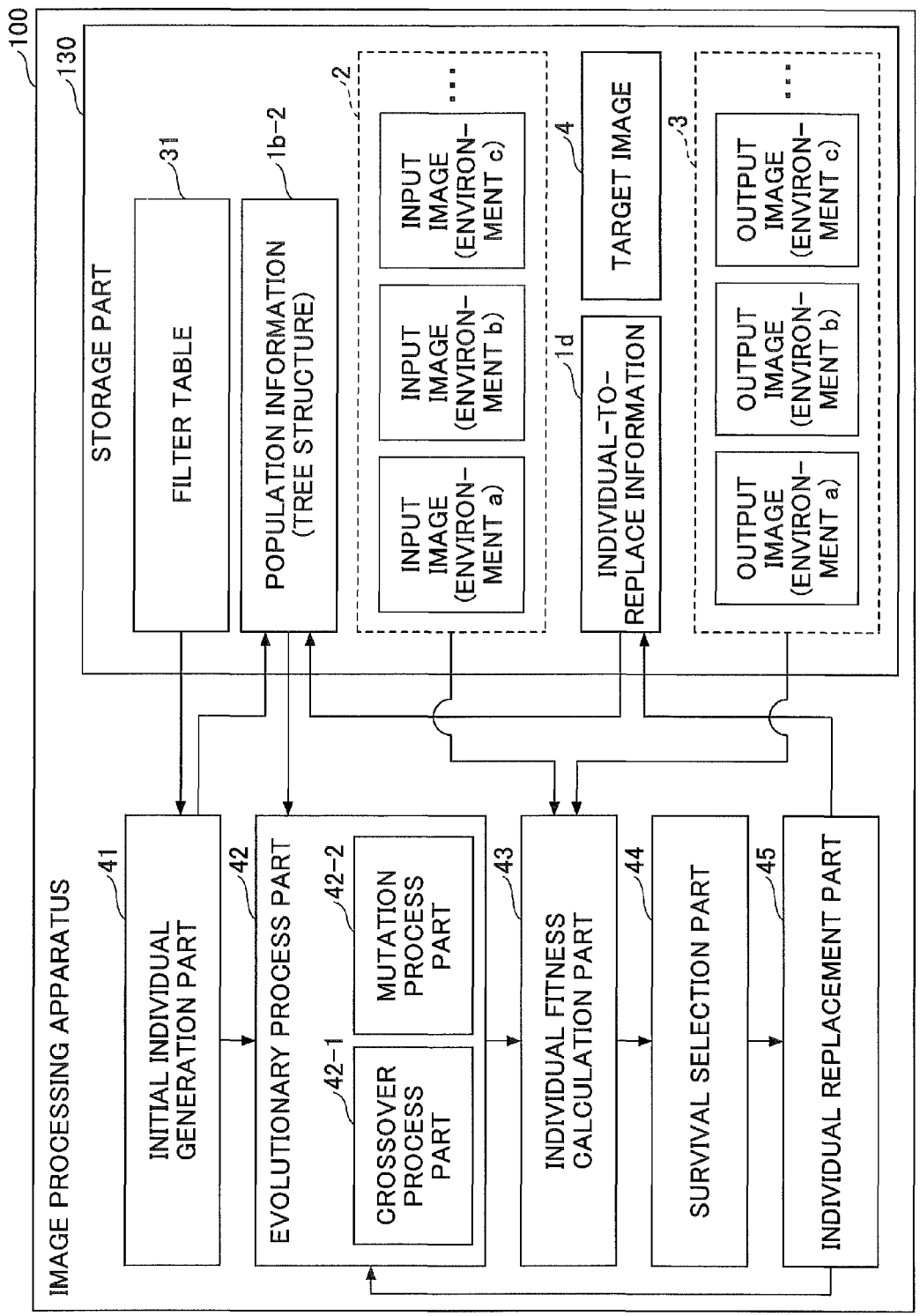
FIG. 4 is a diagram illustrating a functional configuration example of an image processing apparatus in the first embodiment.

FIG. 4 is a diagram illustrating a functional configuration example of an image processing apparatus in the first embodiment. In FIG. 4, the image processing apparatus 100 includes an initial individual generation part 41, an evolutionary process part 42, an individual fitness calculation part 43, a survival selection part 44, and an individual replacement part 45. These parts 41 to 45 are realized by processes performed by a CPU 11 (FIG. 5) which executes respective programs. A storage part 130 (FIG. 5) stores a filter table 31, population information $1b$-2, individual-to-replace information $1d$, the input images 2, the output images 3, the target image 4, and the like.

The initial individual generation part 41 is regarded as a process part which selects image filters having different types for each of layers which are formed due to multiple image processings, and generates a filter structure with the tree structure, in a feature detection to acquire one target image 4 with respect to the multiple input images 2 acquired in different environments.

The initial individual generation part 41 regards the target image 4 as the root of the tree structure. The initial individual generation part 41 selects the image filters from the filter table 31 in which the image filters are classified on the basis of types so as to form each of nodes, and generates the population $1b$ in accordance with an initial individual generation rule $5r$ (FIG. 6B) by using the genetic algorithm. The population $1b$ formed in the tree structure is stored as the population information $1b$-2 in the storage part 130.

The evolutionary process part 42 is regarded as a process part which simulates an evolutionary process. The evolutionary process part 42 includes a crossover process part 42-1 and a mutation process part 42-2. The evolutionary process part 42 retrieves two individuals 9 from the population $1b$ and causes the crossover process part 42-1 to perform the crossover process, and causes the mutation process part 42-2 to perform the mutation process by replacing the two retrieved individuals with two newly selected individuals 9. The population 1b is evolved by the evolutionary process part 42, and the population information 1b-2.

The individual fitness calculation part 43 is regarded as a process part which calculates the fitness for each of the individuals 9. The fitness is calculated by a difference between the output image 3 acquired for each of the input images 2 and the target image 4 which is prepared beforehand.

The fitness may be calculated by the following equation 1:

$$\text{fitness} = \frac{1}{n} \sum_{k=1}^{n} \left\{ 1 - \frac{\sum_{x=1}\sum_{y=1} w_k(x, y)|O_k(x, y) - T_k(x, y)|}{\sum_{x=1}\sum_{y=1} w_k(x, y) \cdot V_{max}} \right\} \quad \text{[Equation 1]}$$

The survival selection part 44 is regarded as a process part which selects one individual 9 which is a best individual based on a predetermined rule. As the predetermined rule, a roulette rule or the like may be used to retain the individual 9 representing a highest fitness.

The individual replacement part 45 is regarded as a process part which newly selects two individuals from the filter table 31 to replace two individuals 9 existing in the population 1b as mutation subjects. The storage part 130 stores the individual-to-replace information 1d which represents two external individuals used to replace.

The above described process is repeated by the evolutionary process part 42. That is, the individuals 9 other than the best individual in the population 1b, two individuals 9 as crossover subjects and two individuals 9 as the mutation subjects are selected. The crossover process and the mutation process are alternately performed. This iterative process may be terminated when the fitness becomes greater than or equal to a predetermined value as a result from calculating the fitness as a whole of the population 1b by the individual fitness calculation part 43.

By using the population 1b (representing the filter structure) acquired by the iterative process, the feature detection is conducted in a quality check of a Large Scale Integration (LSI) with respect to a defect or the like.

Figure 5:
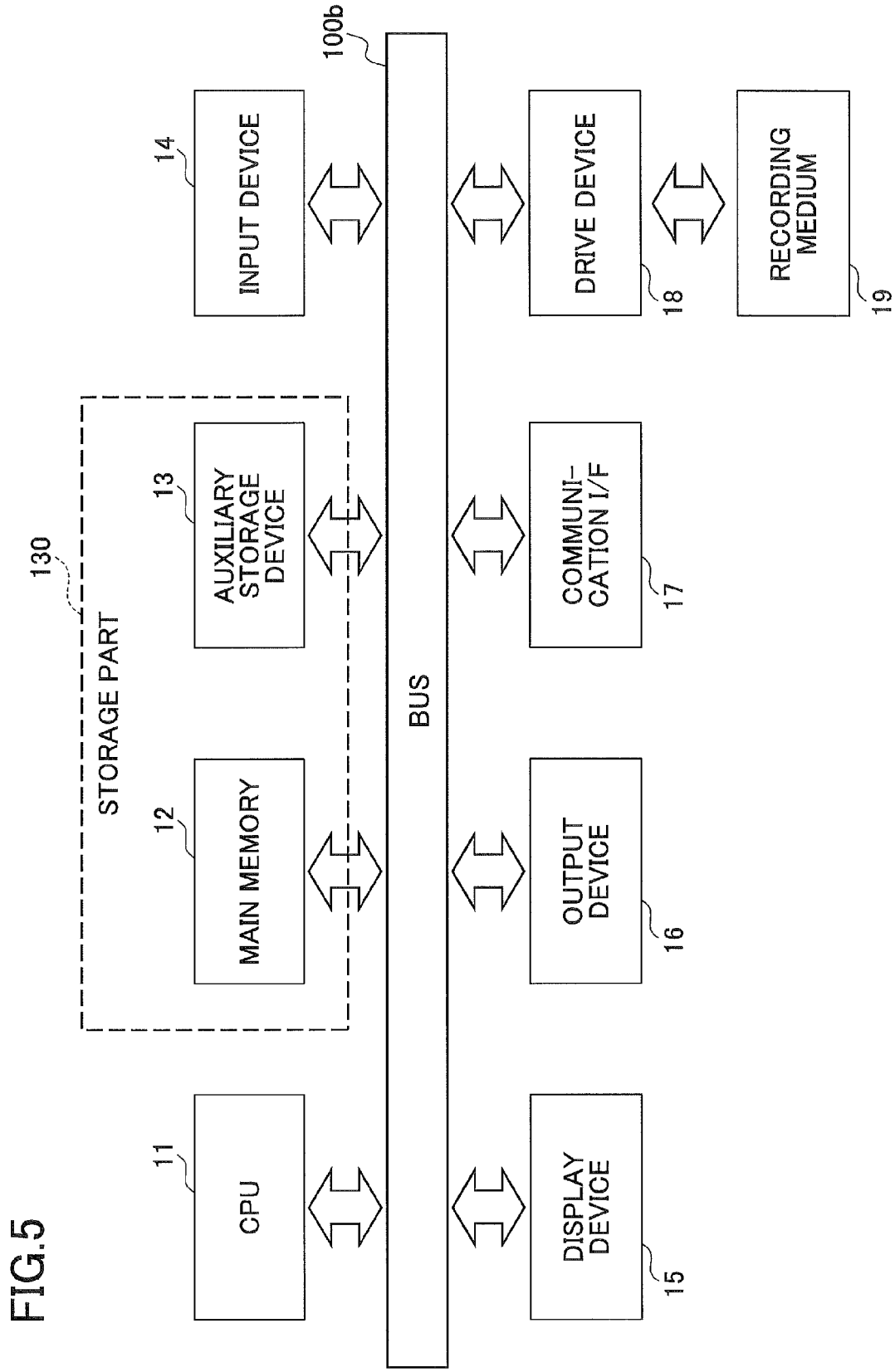
FIG. 5 is a diagram illustrating a hardware configuration of the image processing apparatus in the first embodiment.

The image processing apparatus 100, which conducts various processes according to the first embodiment as described above, may have a hardware configuration as illustrated in FIG. 5. FIG. 5 is a diagram illustrating a hardware configuration of the image processing apparatus in the first embodiment. In FIG. 5, the image processing apparatus 100 is a terminal controlled by a computer, and includes a processor such as the Central Processing Unit (CPU) 11, a main memory 12, an auxiliary storage device 13, an input device 14, a display device 15, an output device 16, a communication InterFace (I/F) 17, and a drive device 18, which are mutually connected via a bus 100b.

The CPU 11 controls the image processing apparatus 100 in accordance with programs stored in the main memory 12. The main memory 12 includes a Random Access Memory (RAM) or the like, and stores a program executed by the CPU 11, and data used in a process performed by the CPU 11, data acquired in the process performed by the CPU 11, and the like. A part of an area of the main memory 12 is assigned as a working area used in the process performed by the CPU 11.

The auxiliary storage device 13 may be a hard disk drive and stores the programs and the data for various processes. A part of the program stored in the auxiliary storage device 13 is loaded to the main memory 12, and is executed by the CPU 11, so as to realize the various processes. The storage part 130 includes the main memory 12 and/or the auxiliary storage device 13.

The input device 14 includes a mouse, a keyboard, and the like, and is used for a user to input various information items used in the process of the image processing apparatus 100. The display device 15 displays various information items under control of the CPU 11. The output device 16 is used to output various information items in response to an instruction of the user. The communication I/F 17 conducts control of communication with an external apparatus by connecting to an Internet, a Local Area Network (LAN), or the like. The communication by the communication I/F 17 is not limited to wireless communication or wired communication.

The programs realizing the process according to the first embodiment in the image processing apparatus 100 may be provided by a recording medium 19 such as a Compact Disc Read-Only Memory (CD-ROM) with the image processing apparatus 100. That is, when the program stored in the recording medium 19 is set in the drive device 18, the drive device 18 reads out the program from the recording medium 19. The program is installed into the auxiliary storage device 13 via the bus 100b. When the CPU 11 is instructed to execute the program, the CPU 11 performs the process in accordance with the program installed in the auxiliary storage device 13. The recording medium 19 is not limited to the CD-ROM to store the program. The recording medium 19 may be a Digital Versatile Disk (DVD), a Universal Serial Bus (USB) memory, a semiconductor memory such as a flash memory, or the like. Any non-transitory (or tangible) computer-readable recording medium may be used.

An initial individual generation process performed by the initial individual generation part 41 will be described with reference to FIG. 6A and FIG. 6B. FIG. 6A and FIG. 6B are diagrams for explaining the initial individual generation process in the first embodiment. Referring FIG. 6A, in an image process for extracting features of the target image 4, an output image dst is regarded as the root. In order to form each of the nodes, one or more image filters are selected depending on each of layers. When the image filters are selected until a certain layer, a source image src (corresponding the input image 2) is selected as an end node. In a case of extracting a feature area, binary image processing is selected for a process immediately prior to the output image dst.

Next, based on the initial individual generation rule 5r (FIG. 6B) which is predetermined beforehand, during a node selection, the binary image processing or a threshold process may be selected when a parent node represents the binary image processing. An image emphasis process or the source image src may be selected when the parent node represents the threshold process or an image emphasis process. When the image filters are selected until the certain layer, the source image src is compulsorily selected.

As described above, a typical process flow may be a sequence of the input image 2→the image emphasis process→the threshold process→the binary image processing→the output image 3. By this process flow, an initial population is generated. In FIG. 6A, a capital letter "F" schematically represents filters for the image emphasis process, a capital letter "T" schematically represents filters for the threshold process, and a capital letter "B" schematically represents filters for the binary image processing.

In the first embodiment, depth is defined beforehand for a whole process formed by all nodes. Also, depth of the nodes is defined for a property for each of the processes, that is, for each of the image emphasis process, the threshold process, and the binary image processing. The depth for the whole process is defined to represent less than or equal to $20^{th}$ depth. That is, maximum depth for the whole process is defined to represent 20 layers. Furthermore, the depth "20" may be broken down to a depth "5" for the filters conducting the image emphasis process, a depth "1" for the filters conducting the threshold process, and a depth "14" for the filters conducting the binary image processing in a process order of the input image 2. Each of the image emphasis process, the threshold process, and the binary image processing corresponds to one layer.

Based on the above described depth definition for each of the layers (that is, for each of the processes), the initial individual generation process, in which the filter structure being the tree structure is generated by the initial individual generation part 41, will be described with reference to FIG. 7.

Figure 7:
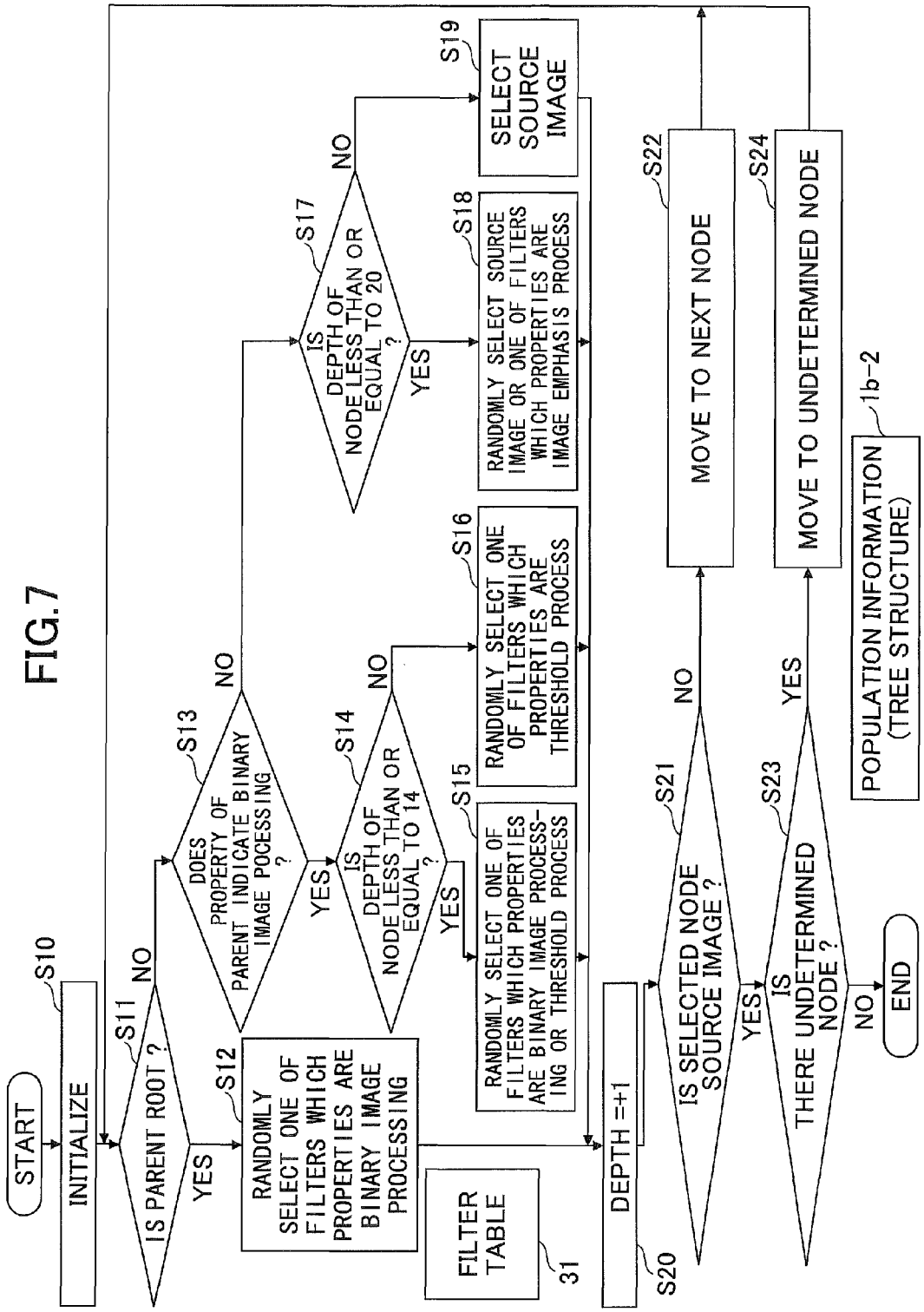
FIG. 7 is a flowchart for explaining an example of an initial individual generation process in the first embodiment.

FIG. 7 is a flowchart for explaining an example of the initial individual generation process in the first embodiment. In FIG. 7, the initial individual generation part 41 sets identification information of the root as the parent node (the target image 4) and initializes a depth counter to one (step S10).

The initial individual generation part 41 determines whether the parent node (the target image 4) is the root (step S11). When the parent node is the root (YES of step S11), the initial individual generation part 41 randomly selects the filters of which the property represents the binary image processing by referring to the filter table 31 (step S12). The initial individual generation part 41 sets the selected node to the identification information of the selected filter. Also, the initial individual generation part 41 links an output of the selected node to a input of the parent node, and records link information to the population information 1b-2. In this case, a depth counter value is recorded by corresponding to the selected node. The initial individual generation part 41 advances to step S20.

On the other hand, when the parent node is not the root (NO of step S11), the initial individual generation part 41 determines whether the property of the parent node represents the binary image processing (step S13). When the property represents the binary image processing (YES of step S13), the initial individual generation part 41 determines whether the depth of the node indicated by the depth counter is less than or equal to 14 (step S14). When the depth of the node is less than or equal to 14 (YES of step S14), the initial individual generation part 41 randomly selects, by referring to the filter table 31, one filter from the filters each of which the property represents the binary image processing or the threshold process, and sets the selected filter as the selected node (step S15). Also, the initial individual generation part 41 links the output of the selected node to the input of the parent node, and records the link information to the population information 1b-2. In this case, the depth counter value is stored by corresponding to the selected node. Then, the initial individual generation part 41 advances to step S20.

On the other hand, when the depth of the selected node is greater than 14 (NO of step S14), the initial individual generation part 41 randomly selects, by referring to the filter table 31, one of the filters in which the properties represent the threshold process, and sets the selected filter as the selected node (step S16). That is, the identification information of the selected filter is set to the selected node. Also, the initial individual generation part 41 links the output of the selected node to the input of the parent node, and records the link information to the population information 1b-2. In this case, the depth counter value is stored by corresponding to the selected node. Then, the initial individual generation part 41 advances to step S20.

When the property of the parent node does not represent the binary image processing (NO of step S13), the initial individual generation part 41 further determines whether the depth of the node indicated by the depth counter is less than or equal to 20 (step S17). When the depth of the node is less than 20 (YES of step S17), the initial individual generation part 41 randomly selects the source image or one of the filters in which the properties represent the image emphasis process, and sets the source image or the selected filters as the selected node (step S18). The initial individual generation part 41 sets the identification information of the selected filter to the selected node. Also, the initial individual generation part 41 links the output of the selected node to the input of the parent node, and records the link information to the population information 1b-2. In this case, the depth counter value is stored by corresponding to the selected node. The initial individual generation part 41 advances to step S20.

On the other hand, when the depth of the node is greater than 20 (NO of step S17), the initial individual generation part 41 selects the source image and sets the source image as the selected node (step S19). The initial individual generation part 41 sets the identification information of the selected filter as the selected node. Also, the initial individual generation part 41 links the output of the selected node to the input of the parent node, and records the link information to the population information 1b-2. In this case, the depth counter value is stored by corresponding to the selected node. Then, the initial individual generation part 41 advances to step S20.

The initial individual generation part 41 increments the depth counter by one (step S20), and determines whether the selected node is the source image (step S21). When the selected node is the source image (NO of step S21), the initial individual generation part 41 performs a process to move to a next node (step S22). A current node is set to the parent node. The initial individual generation part 41 goes back to step S11, and the above described process is conducted in the same manner.

On the other hand, when the selected node is the source image (YES of step S21), the initial individual generation part 41 further determines whether there is an undetermined node (step S23). The undetermined node may be determined by checking based on the population information 1b-2 in the storage part 130 whether there is the selected node having the input which is not linked. When there is the undetermined node branching to an unlinked input (YES of step S23), the initial individual generation part 41 moves to the undetermined node linked from the selected node (step S24). The selected node is set as the parent node. Also, the depth of the selected node is set to the depth counter. The initial individual generation part 41 goes back to step S11, and the above described process is conducted in the same manner.

On the other hand, when there is no undetermined node (NO of step S23), the initial individual generation part 41 terminates this initial individual generation process.

Respective determination values "14" and "20" related to the depth of the node in step S14 and S17 may be set by the user.

The filter table 31 referred to in the flowchart in FIG. 7 may have a data structure as illustrated in FIG. 8A and FIG. 8B. FIG. 8A and FIG. 8B are diagrams illustrating a data structure example of the filter table in the first embodiment. In FIG. 8, the filter table 31 includes items of PROPERTY, DEPTH, PROCESS NAME, IDENTIFICATION INFORMATION, INPUT, OUTPUT, and the like.

The item "PROPERTY" indicates information to specify the layer. The item "PROPERTY" may indicate the image emphasis process, the threshold process, the binary image processing, or the like. The item "DEPTH" indicates a value in which the depth assigned to the layer is accumulated in the order of processing the input image. The item "PROCESS NAME" indicates a function of the filter. The item "IDENTIFICATION INFORMATION" indicates information to identify the filter. The item "INPUT" indicates a number of inputs of the filter, and the "OUTPUT" indicates a number of outputs of the filter.

Figure 9:
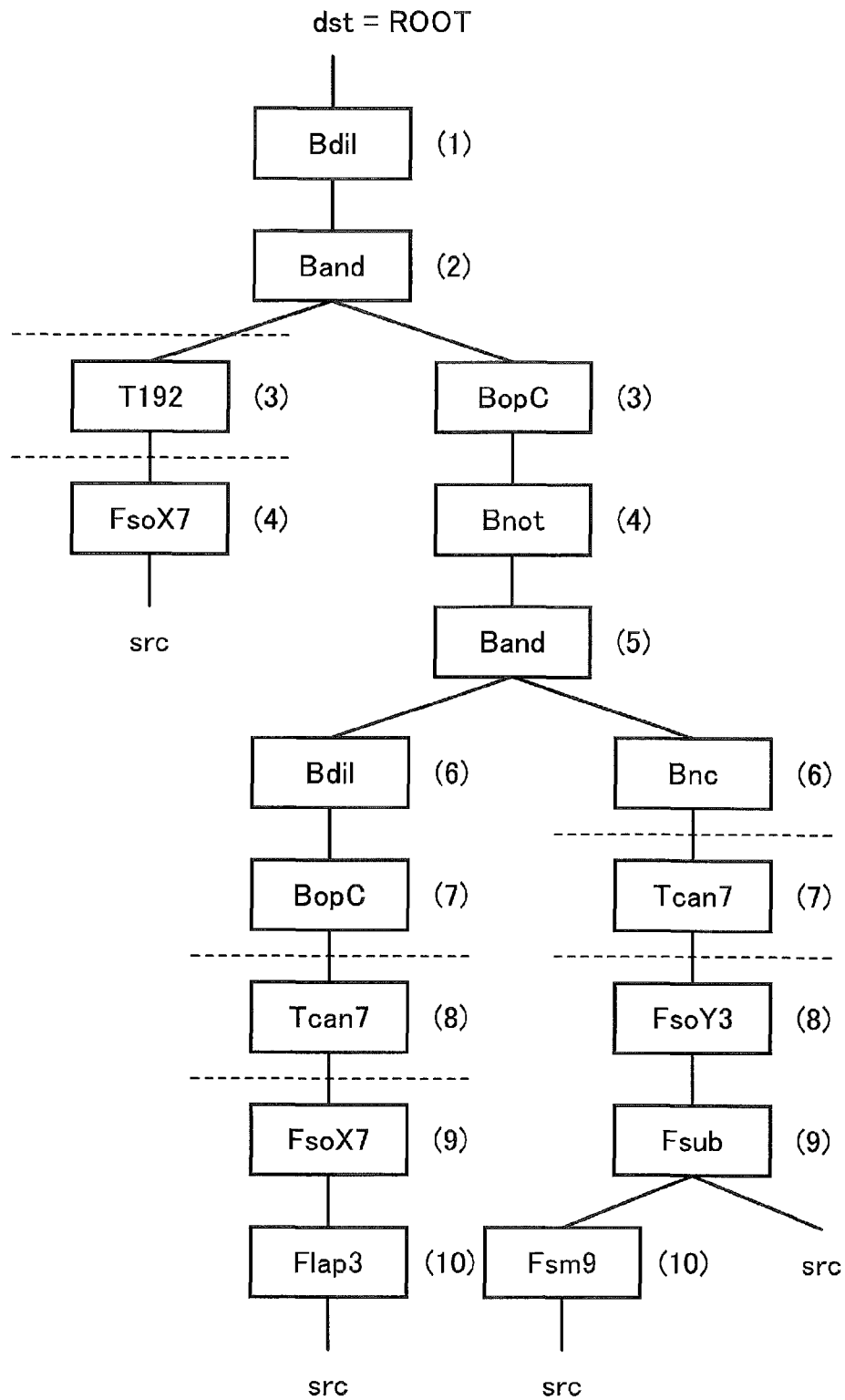
FIG. 9 is a diagram illustrating a filter structure example represented by population information in the first embodiment.

A tree structure example of the filter structure represented by the population information 1$b$-2 will be described with reference to FIG. 9 in a case in which the initial individuals are generated in accordance with the flowchart illustrated in FIG. 7 by referring to the filter table 31 as illustrated in FIG. 8A and FIG. 8B. FIG. 9 is a diagram illustrating a filter structure example represented by the population information in the first embodiment. In FIG. 9, values are indicated inside parenthesis "( )".

In FIG. 9, from the output image dst (the target image 4) set at the root, a filter "Bdil" of the binary image processing is linked at depth "1", a filter "Band" of the binary image processing is linked at depth "2", a filter "T192" of the threshold process is linked at depth "3", a filter "FsoX7" of the threshold process is linked at depth "4", and then, the source image src is linked.

The filter "Band" at the depth "2" has two inputs. When the filter "Band" having an unlinked input is detected by a determination of presence or absence of the undetermined node in step S23 in FIG. 7, the depth "2" for the filter "Band" indicated in the population information 1$b$-2 is set to the depth counter, and depth counter is incremented from the depth "2". Processes from step S11 to step S22 are repeated. As a result, a filter "BopC" of the binary image processing is linked at depth "3", a filter "Bnot" of the binary image processing is linked at depth "4", and then, the filter "Band" of the binary image processing is liked at depth 5. Furthermore, the filter "Bdil" of the binary image processing is linked at depth "6", the filter "BopC" of the binary image processing is linked at depth "7", the filter "Tcan7" of the threshold process is linked at depth "8", the filter "Fsox7" of the image emphasis process is linked at depth "9", the filter "Flap3" of the binary image processing is lined at depth "10", and then, the source image src is linked.

As described above, the filter "Band" at the depth "5", which has the unlinked input, is detected in step S23 in FIG. 7. Accordingly, the depth "5" for the filter "Band" indicated in the population information 1$b$-2 is set to the depth counter, and depth counter is incremented from the depth "5". As a result from repeating the processes from step S11 to step S22, a filter "Bnc" of the binary image processing is linked at the depth "6", the filter "Tcan7" of the threshold process is linked at the depth "7", a filter "FsoY3" of the image emphasis process is linked at the depth "8", a filter "Fsub" of the image emphasis process is linked at depth "9", the filter "Fsm9" of the image emphasis process is linked at depth "10", and then, the source image src is linked.

Moreover, in response to a detection of the filter "Fsub" at the depth "9" which has the unlinked input in step S23 in FIG. 7, the source image src is linked.

Figure 10:
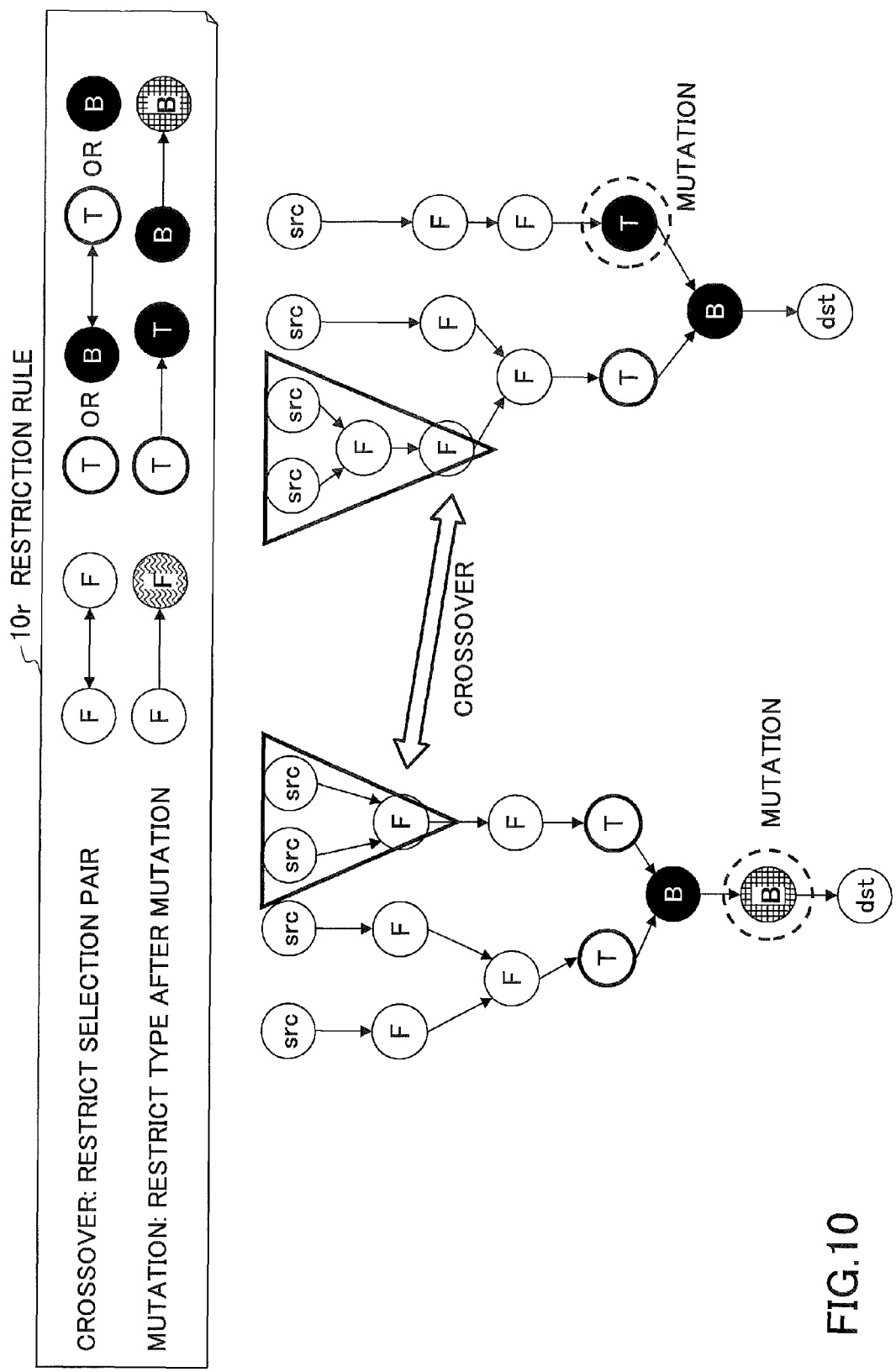
FIG. 10 is a diagram for explaining an evolutionary process in the first embodiment.

Next, the evolutionary process conducted by the evolutionary process part 42 will be described. FIG. 10 is a diagram for explaining the evolutionary process in the first embodiment. In the first embodiment, the crossover process and the mutation process are conducted by the crossover process part 42-1 and the mutation process part 42-2, respectively, based on a restriction rule 10$r$. The restriction rule 10$r$ restricts selections of a crossover pair and a type after the mutation.

In the crossover by the genetic programming, nodes of a portion of a branch to be paired are selected depending on types of outputs thereof. In a case in which the feature area is extracted, for the pair of the crossover, when one node is the image emphasis process (F), another node is the image emphasis process (F). When one node is the threshold process (T) or the binary image processing (B), another one is the threshold process (T) or the binary image processing (B). Moreover, for the mutation, the nodes (the filters) having the same types are selected. By the restriction rule 10$r$, it is possible to conduct a generation change in the evolutionary process without modifying the flow of the image processing.

Next, a comparison between the first embodiment and the related art will be described in a case of detecting a portion of a solder ball. The detection of the feature area is conducted in the same manner as one in FIG. 6A, that is, in accordance with the order of the image emphasis process→the threshold process→the binary image processing. The type of the filter to be a component element is selected by referring to the filter table 31 indicated in FIG. 8. The initial individual generation in FIG. 6A and FIG. 6B and a restriction of the evolutionary process in FIG. 10 are applied.

Figure 11:
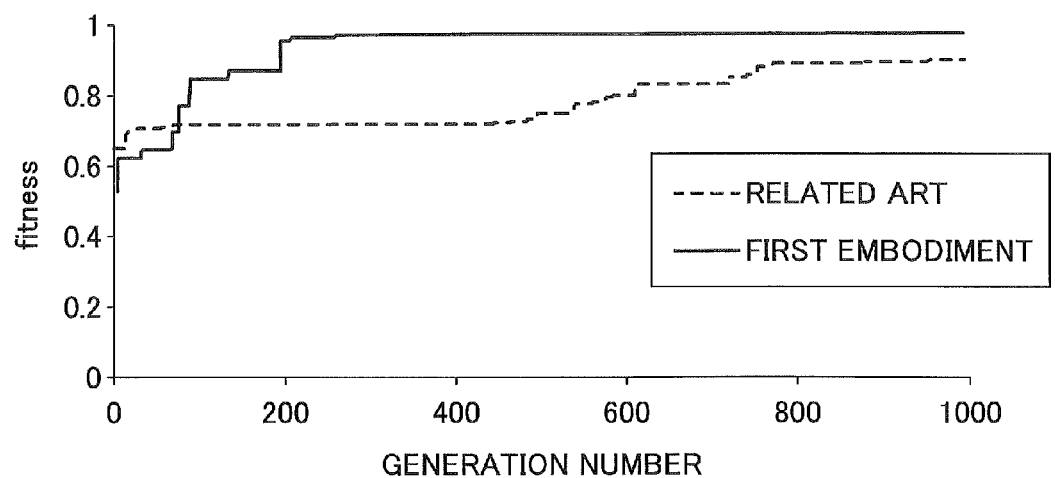
FIG. 11 is a diagram for explaining a comparison between transitions of a fitness at a learning time in the first embodiment and a related art.

FIG. 11 is a diagram for explaining a comparison between transitions of the fitness at a learning time in the first embodiment and the related art. In FIG. 11, the depth of the tree structure is restricted to 20 and an initial individual number is restricted to 30. The transitions of a maximum fitness at the learning time are illustrated in the first embodiment and the related art, respectively, until a $1000^{th}$ generation. Compared with the related art, in the first embodiment, it is possible to search for the image processing algorithm having a higher fitness faster.

Figure 12:
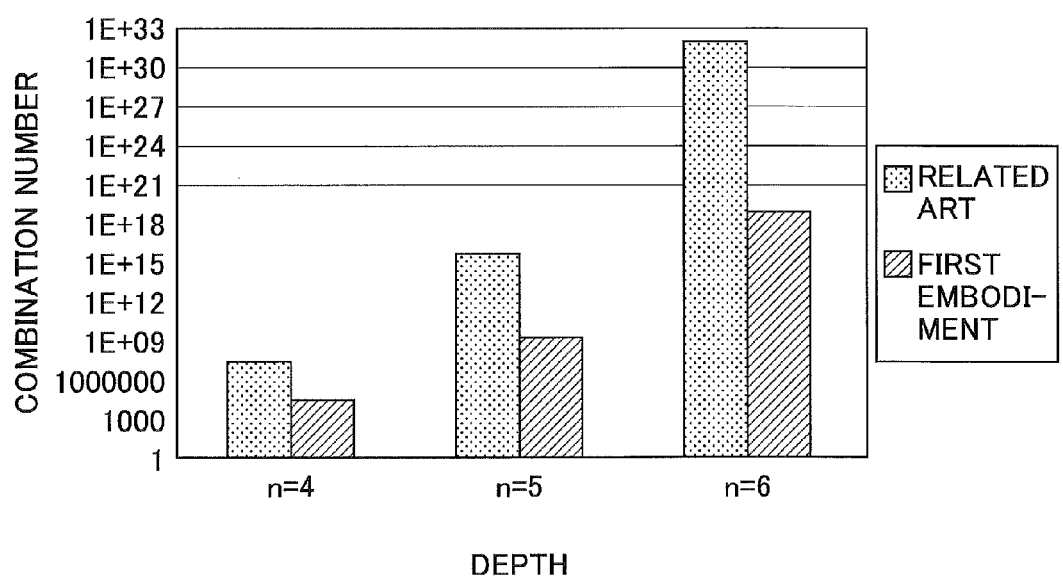
FIG. 12 is a diagram for explaining a comparison between combination numbers depending on depth of tree structure in the first embodiment and the related art.

FIG. 12 is a diagram for explaining a comparison between combination numbers depending on the depth of the tree structure in the first embodiment and the related art. In FIG. 12, in the first embodiment, a combination number is approximately $\frac{1}{1000}$ the related art at a depth n=4. At any depth greater than a $4^{th}$ depth, the combination number is dramatically less than the related art.

As described above, the process flow is broadly indicated. Thus, it is possible to narrow a search range, and to search for the image processing algorithm having the higher fitness at higher speed.

As described above, in the first embodiment, by roughly indicating the process flow, it is possible to dramatically narrow the search range of the related art (such as ACTIT). It is possible to search for the image processing algorithm having the higher fitness at higher speed.

In the above described image processing algorithm in the first embodiment, the genetic programming (GP) is used. In the genetic programming, the individuals 9 forming the image processing filter group of the tree structure is automatically generated by setting the learning data as a reference. As a result, the population 1$b$, which is automatically generated, may not exhibit performance with respect to the input image 2 having a type different from that of the learning data.

In a case of automatically generating the individuals 9 of the multiple image processing filters which represent the filter structure by using a large amount of the learning data, the learning time is incredibly increased. Hence, this manner of the automatic generation is not practical in an actual operation. Accordingly, a second embodiment will be described. In the second embodiment, by capturing an image feature of an application destination from sampling data and appropriately selecting the learning data, a highly versatile algorithm is generated.

Second Embodiment

Figure 13:
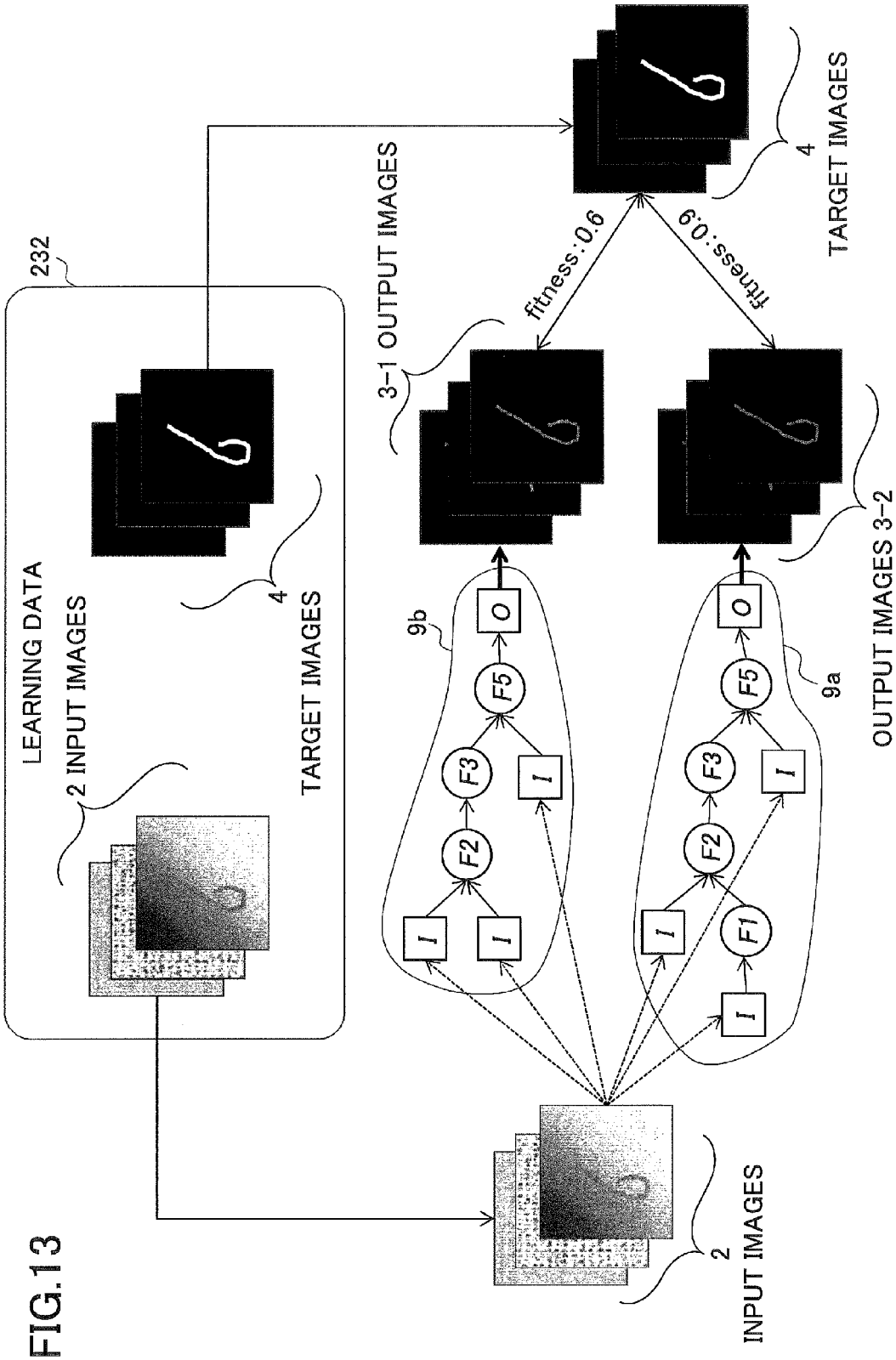
FIG. 13 is a diagram illustrating fitness examples of two individuals.

A fitness example between two individuals 9a and 9b representing the image processing filter groups will be described. FIG. 13 is a diagram illustrating fitness examples of the two individuals 9a and 9b acquired in the first embodiment.

Learning data 232 includes multiple input images 2 corresponding to multiple source images which are selected beforehand, and the target images 4 corresponding to the multiple input images 2.

The two individuals 9a and 9b are regarded as tree-structural filters. The individual 9a includes multiple image processing filters (hereinafter, simply called "filters") $F_1$, $F_2$, $F_3$ and $F_5$. Also, the filters may be called "nodes". The individual 9b includes the filters $F_2$, $F_3$ and $F_5$. Output images 3-1 correspond to an output result which is acquired by performing the image processing with respect to the input images 2 of the learning data 232 by using the individual 9a. Also, output images 3-2 correspond to an output result which is acquired by performing the image processing with respect to the input images 2 by using the individual 9b.

Referring to respective results from calculating the fitness of each of the output images 3-1 and the output images 3-2, the fitness of the output images 3-1 indicate "0.6" and the fitness of the output image 3-2s indicate "0.9". Accordingly, with respect to the same input images 2, the fitness is preferable in a case of conducting the image processing by a filter group of the individual 9a more than the individual 9b. The tree-structural filter formed by the individual 9a is employed.

As described above, in the Tree-structural Image Transformation, the learning data 232 are set as the reference, and the tree-structural filter is automatically generated. However, there is a case in which the target images 4 are not acquired by the tree-structural filter, which is automatically generated with respect to an input image which has a different type from that of the input images 2 in the learning data 232. In the second embodiment, the input images 2 are regarded as subject images to acquire respective target images 4.

Figure 14:
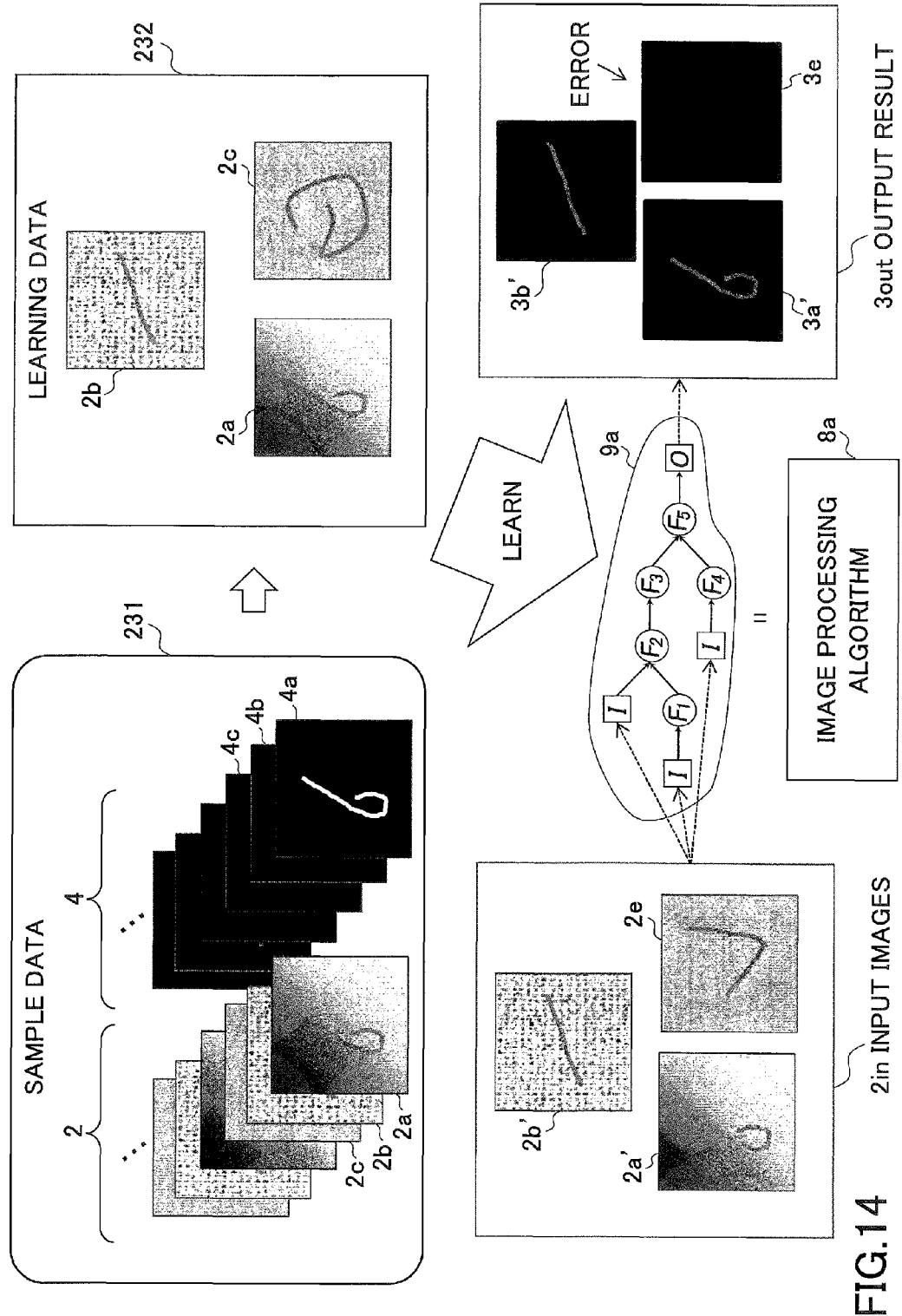
FIG. 14 is a diagram illustrating an example of a case in which a target image is not acquired.

FIG. 14 is a diagram illustrating an example of a case in which the target images are not acquired. In FIG. 14, a case of employing the tree-structural filter of the individual 9a will be described. An algorithm is generated by the learning data 232 which are selected from the sample data 231. The algorithm is represented by the tree-structural filter of the individual 9a, and hereinafter, is called an "image processing algorithm 8a".

The sample data 231 includes the multiple input images 2, which were previously captured, the target images 4 to detect, and the like. The target images 4 are prepared for the multiple input images 2, respectively. The input images 2 are associated with the target images 4, respectively. The sample data 231 include input images 2a, 2b, 2c. In the target images 4, target images 4a, 4b, and 4c correspond to the input images 2a, 2b, and 2c, respectively.

In the learning data 232, the input images 2a, 2b, and 2c are selected from the input images 2 in the sample data 231. Also, it is indicated in the learning data 232 that the target images 4a, 4b, and 4c correspond to the selected input images 2a, 2b, and 2c.

When images 2a', 2b', and 2e, which are captured, are input as input images 2in to the image processing algorithm 8a, output results 3out are acquired. The output results 3out indicate that an output image 3a' is acquired for the image 2a', an output image 3b' is acquired for the image 2b', and an output image 3e is acquired for the image 2e.

The image 2e is not similar to any of the target images 4a, 4b, and 4c in the learning data 232. The output image 3e corresponds to an image resulting from the image processing by the image processing algorithm 8a with respect to the image 2e in the input images 2in. From the output image 3e, it is determined that a feature extraction has failed.

Similar to a case of the image 2e, when the image processing is conducted by the image processing algorithm 8a, for an image which is not similar to any of the target images 4a, 4b, and 4c in the learning data 232, a result may be an error.

In the second embodiment, learning capturing the image feature of the application destination is conducted, and the learning data 232 is adjusted by using the tree-structural filter acquired in the middle of the learning. Hence, the image processing algorithm 8a with higher versatility is acquired.

Figure 15:
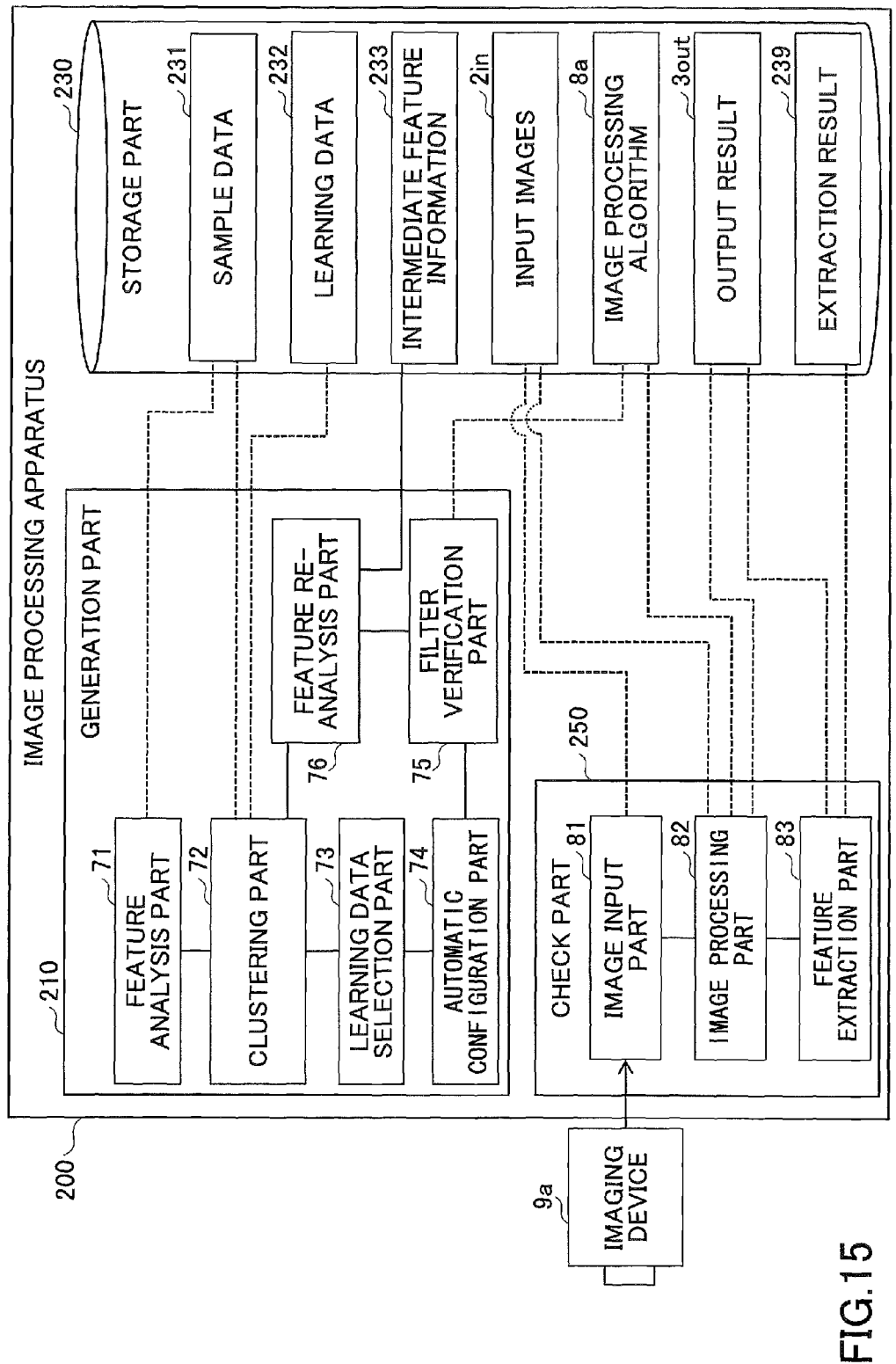
FIG. 15 is a diagram illustrating a functional configuration example of an image processing apparatus in a second embodiment.

FIG. 15 is a diagram illustrating a functional configuration example of an image processing apparatus 200 in the second embodiment. In FIG. 15, the image processing apparatus 200 mainly includes a generation part 210, and a check part 250. A storage part 230 of the image processing apparatus 200 stores the sample data 231, the learning data 232, intermediate feature information 233, the input images 2in, the image processing algorithm 8a, the output results 3out, an extraction result 239, and the like.

The generation part 210 generates the image processing algorithm 8a usable in a general purpose. The generation part 210 further includes a feature analysis part 71, a clustering part 72, a learning data selection part 73, an automatic configuration part 74, a filter verification part 75, and a feature re-analysis part 76.

The feature analysis part 71 analyzes the feature of the sample data 231. The sample data 231 include the input images 2 as the source images, and the target images 4. The feature analysis part 71 acquires an image feature amount by analyzing each of the input images 2 in the sample data 231.

An average luminance, a luminance histogram, space frequency information, and the like of the input images 2 are regarded as parts of multiple parameters of the image feature amount acquired by the feature analysis part 71. An angle component and a frequency component are included in the space frequency information.

The clustering part 72 classifies multiple sets of the sample data 231 based on a feature amount of each of main components in multiple components acquired by the feature analysis part 71. The frequency component, the average luminance, a contrast, and the like are regarded as main components. A classification method may be a k-means method or the like in which the multiple sets of sample data 231 are classified, by using an average of clusters for each of feature spaces, into k clusters which are given. The input images 2 in the multiple sets of the sample data 231 are classified based on the feature amount.

The learning data selection part 73 selects one set of the learning data 232 from each of classes classified by the clustering part 72. For each of the clusters, one input image 2 closer to a center of the feature amount of the multiple input images 2 is selected as a representative sample. Each set of the learning data 232, which indicates the selected input image 2 as the representative sample, is stored in the storage part 230. An analyzed feature amount is recorded for each of the selected input images 2 (the representative samples) in the learning data 232.

The automatic configuration part 74 generates the image processing algorithm 8a by using the learning data 232 selected by the learning data selection part 73. A generation method of the image processing algorithm 8a complies with that described above in the first embodiment. The image processing algorithm 8a is created by combining a plurality of the image processing filters in the tree structure in accordance with a given process flow.

The filter verification part 75 conducts a filter verification by using the image processing algorithm 8a which is automatically generated. When a target process accuracy is not satisfied, the image processing algorithm 8a is re-modified.

The feature re-analysis part 76 applies the image processing algorithm 8a to each of the input images 2 in the sample data 231, and acquires the intermediate feature information 233. The intermediate feature information 233 indicates the feature amount of an intermediately-processed image which is acquired by each of the filters of the image processing algorithm 8a.

Based on the feature amount of the intermediately-processed image acquired by the feature re-analysis part 76, the clustering part 72 conducts clustering of the input images 2 in the sample data 231, again. Then, one input image 2 to be the representative sample is included in the learning data 232. The automatic configuration part 74 re-generates the image processing algorithm 8a by using the learning data 232. The filter verification part 75 verifies the image processing algorithm 8a which is re-generated.

When the target process accuracy is satisfied, the generation of the image processing algorithm 8a is terminated. The image processing algorithm 8a is in an available state for the check part 250.

The check part 250 conducts the image process by using the image processing algorithm 8a with respect to the input images 2in which are captured by an imaging device 9a. Then, the check part 250 extracts feature portions of the input images 2in based on the output results 3out. The check part 250 further includes an image input part 81, an image processing part 82, and a feature extraction part 83.

The image input part 81 takes in the input images 2in captured by the imaging device 9a into the image process apparatus 200. The input images 2in are stored in the storage part 230.

The image processing part 82 conducts the image processing by employing the image processing algorithm 8a with respect to the input images 2in, and outputs the output results 3out to the storage part 230.

The feature extraction part 83 extracts an area indicating the feature corresponding to the target image 4 from each of the output results 3out, and outputs the extraction result 239 to the storage part 230.

Figure 16:
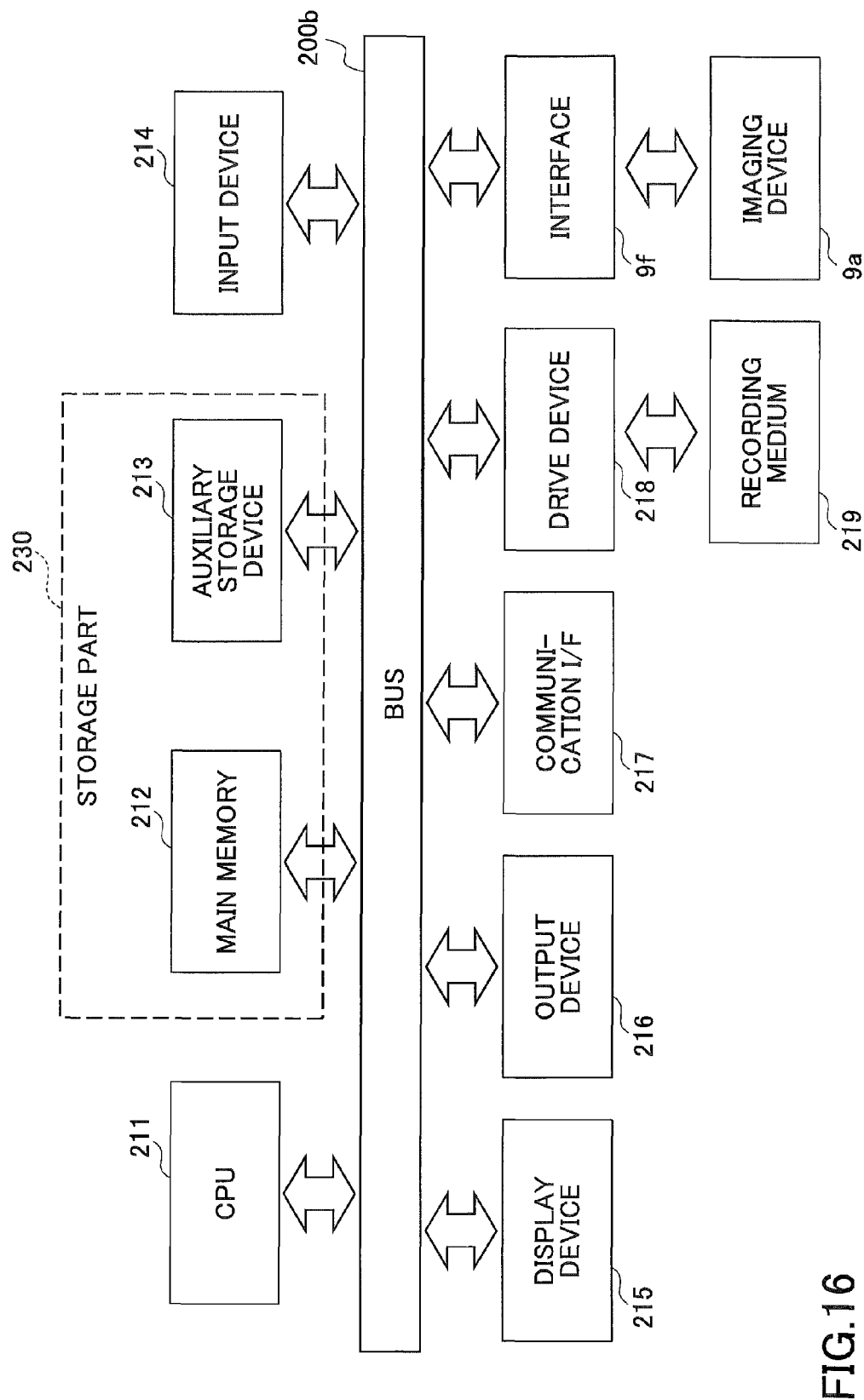
FIG. 16 is a diagram illustrating a hardware configuration of the image processing apparatus in the second embodiment.

The image processing apparatus 200, which conducts the processes according to the first embodiment described above, may include a hardware configuration as illustrated in FIG. 16. FIG. 16 is a diagram illustrating the hardware configuration of the image processing apparatus 200 in the second embodiment. In FIG. 16, the image processing apparatus 200 is a terminal controlled by a computer, and includes a processor such as a Central Processing Unit (CPU) 211, a main memory 212, an auxiliary storage device 213, an input device 214, a display device 215, and output device 216, a communication InterFace (I/F) 217, a drive device 218, and an interface 9f which are mutually connected via a bus 200b.

The CPU 211 controls the image processing apparatus 200 in accordance with programs stored in the main memory 212. The main memory 212 includes a Random Access Memory (RAM) or the like, and stores a program executed by the CPU 211, and data used in a process performed by the CPU 211, data acquired in the process performed by the CPU 211, and the like. A part of an area of the main memory 212 is assigned as a working area used in the process performed by the CPU 211.

The auxiliary storage device 213 may be a hard disk drive and stores the programs and the data for various processes. A part of the program stored in the auxiliary storage device 213 is loaded to the main memory 212, and is executed by the CPU 211, so as to realize the various processes. The storage part 230 includes the main memory 212 and/or the auxiliary storage device 213.

The input device 214 includes a mouse, a keyboard, and the like, and is used for a user to input various information items used in the process of the image processing apparatus 200. The display device 215 displays various information items under control of the CPU 211. The output device 216 is used to output various information items in response to an instruction of the user. The communication I/F 217 conducts control of communication with an external apparatus by connecting to an Internet, a Local Area Network (LAN), or the like. The communication by the communication I/F 217 is not limited to wireless communication or wired communication.

The interface 9f connects the imaging device 9a to the image processing apparatus 200. The images 2a', 2b', and the like captured by the imaging device 9a are stored by control of the CPU 211 as the input images 2in in the storage part 230 through the interface 9f. The imaging device 9a may be a Charge Coupled Device (CCD) camera or the like.

The programs realizing the process according to the first embodiment in the image processing apparatus 200 may be provided with a recording medium 219 such as a Compact Disc Read-Only Memory (CD-ROM) to the image processing apparatus 200. That is when the program stored in the recording medium 219 is set in the drive device 218, the drive device 218 reads out the program from the recording medium 219. The program is installed into the auxiliary storage device 213 via the bus 200b. When the CPU 211 is instructed to execute program, the CPU 211 performs the process in accordance with the program installed in the auxiliary storage device 213. The recording medium 219 is not limited to the CD-ROM to store the program. The recording medium 219 may be a Digital Versatile Disk (DVD), a Universal Serial Bus (USB) memory, a semiconductor memory such as a flash memory, or the like. Any non-transitory (or tangible) computer-readable recording medium may be used.

The generation part 210 and the check part 250 in FIG. 15 are realized by processes performed by the CPU 211 which executes respective programs.

Next, a generation process, which the generation part 210 performs to generate the image processing algorithm 8a with higher versatility, will be described.

Figure 17:
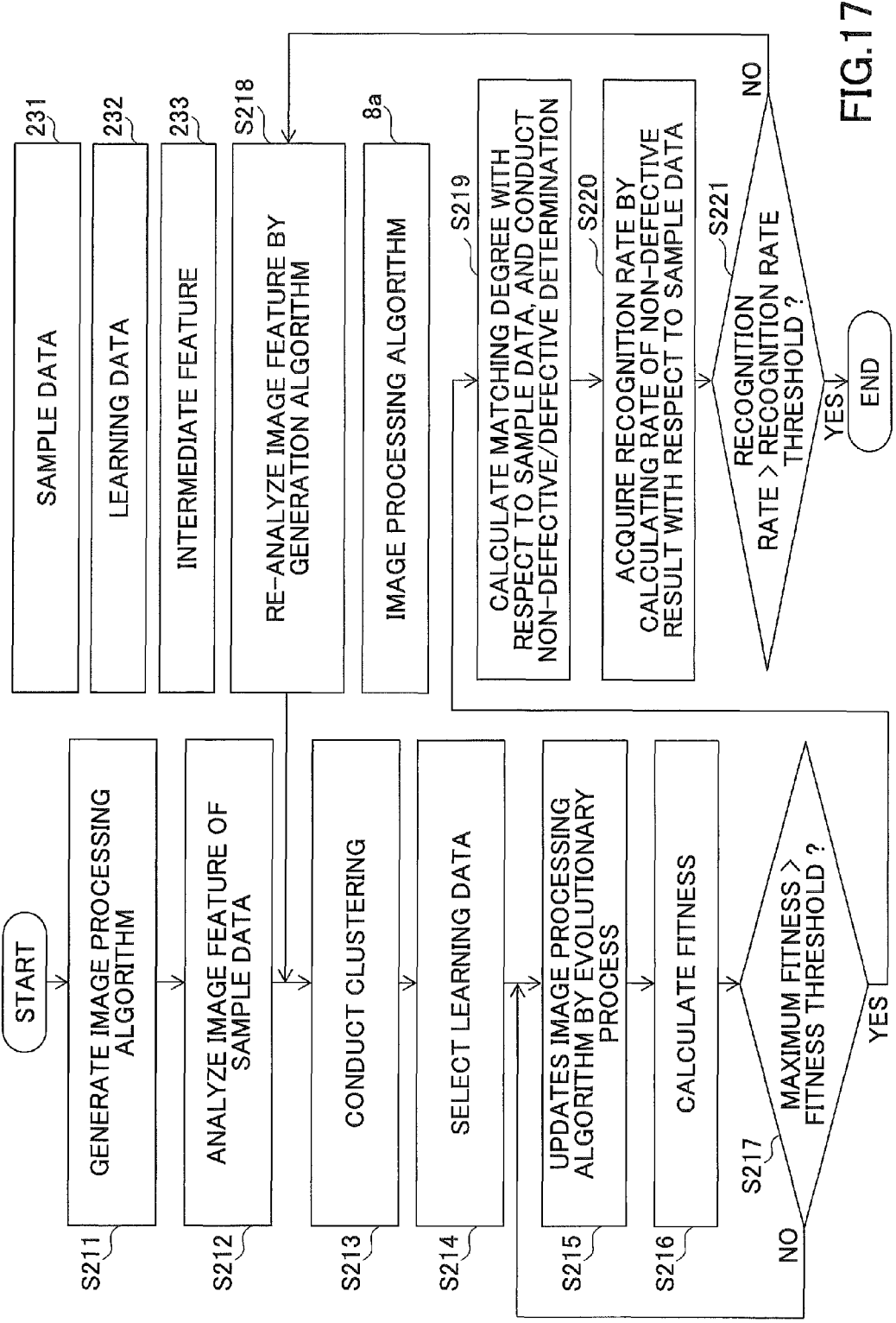
FIG. 17 is a flowchart for explaining a generation process of an image processing algorithm in the second embodiment.

FIG. 17 is a flowchart for explaining the generation process of the image processing algorithm 8*a* in the second embodiment. Referring to FIG. 17, in the generation part 210 an initial filter structure group is generated (step S211). The image processing algorithm 8*a* realized by the initial filter structure group is stored in the storage part 230.

Also, in the generation part 210, the feature analysis part 71 analyzes the image feature for each of the input images 2 being the source images in the sample data 231 (step S212). After analyzing the image feature for each of the input images 2 in the sample data 231, the initial image processing algorithm 8*a* may be generated.

The clustering part 72 acquires an average of the cluster with respect to each of the feature spaces of the main components in multiple image features acquired by the feature analysis part 71, and classifies the input images 2 in the sample data 231 into multiple classes (step S213).

The learning data selection part 73 selects the representative sample from each of sample groups into which the input images 2 are classified by the clustering part 72 (step S214).

When the learning data 232 are selected, the automatic configuration part 74 updates the image processing algorithm 8*a* by the evolutionary process (step S215). An update of the filter structure group is conducted in the same manner as the evolutionary process in the first embodiment, and explanation thereof will be omitted.

The automatic configuration part 74 calculates the fitness of the generated image processing algorithm 8*a* (step S216). The following Equation 2 may be used as a fitness calculation method. But the fitness calculation method is not limited to the following equation 2:

$$\text{fitness} = \frac{1}{n}\sum_{k=1}^{n}\left\{1 - \frac{\sum_{x=1}\sum_{y=1}|O_k(x,y) - T_k(x,y)|}{mV_{max}}\right\} \quad [\text{Equation 2}]$$

n: COMBINATION NUMBER OF SETS OF LEARNING DATA
O(x,y): OUTPUT IMAGE
T(x,y): TARGET IMAGE
m: PIXEL NUMBER
V max: MAXIMUM LUMINANCE VALUE The fitness is calculated every time the image processing algorithm 8*a* is updated, and a fitness value is recorded in the working area of the storage part 230. The automatic configuration part 74 determines whether a maximum fitness value in multiple fitness values stored in the storage part 230 is greater than a fitness threshold (step S217). A learning termination condition is where the maximum fitness is greater than the fitness threshold, with respect to a case of using the learning data 232 selected in step S214, that is, an iterative process for step S215 through step S217.

When the maximum fitness is less than or equal to the fitness threshold, it is determined that sufficient accuracy is not obtained. The automatic configuration part 74 advances to step S215, and repeats an update process by evolving the image processing algorithm 8*a*.

On the other hand, when it is determined that the maximum fitness is greater than the fitness threshold, the verification process is conducted by the filter verification part 75. The filter verification part 75 calculates correspondence to the sample data 231, and conducts a non-defective/defective determination (step S219). The correspondence to the sample data 231 is represented by a correlation value between the output results 3out, which are acquired by inputting the multiple input images 2 of the sample data 231 into the generated image processing algorithm 8*a*, and the target images 4. The correspondence is calculated by the following equation 3:

$$S = 1 - \frac{\sum_{x=1}\sum_{y=1}|O(x,y) - T(x,y)|}{mV_{max}} \quad [\text{Equation 3}]$$

When the correspondence acquired by the Equation 3 is higher than a correspondence threshold defined beforehand, it is determined that the correspondence indicates a non-defective result. When the correspondence is less than or equal to the correspondence threshold, it is determined that the correspondence indicates a defective result. The correspondence threshold for the non-defective/defective determination is determined based on a process accuracy of a target algorithm. In a case in which a region extraction error is less than 10%, 0.9 is set to the correspondence threshold. Non-defective results are counted in the entire input images 2 of the sample data 231.

After that, the filter verification part 75 acquires a recognition rate by calculating a rate of the non-defective results with respect to the sample data 231 (step S220). The rate of number of the non-defective result to a total number of the entire input images 2 in the sample data 231 is calculated and the recognition rate is acquired. The filter verification part 75 determines whether the recognition rate is greater than the recognition rate threshold (step S221).

When the recognition rate is less than or equal to the recognition rate threshold (NO of step S221), the feature re-analysis part 76 re-analyzes the image feature by the generated image processing algorithm 8*a* (step S218). The feature re-analysis part 76 inputs each of the input images 2 in the sample data 231 into the generated image processing algorithm 8*a*, and acquires the feature amount from each of the filters. The intermediate feature information 223 indicating the feature amounts acquired from the filters are stored in the storage part 230.

The clustering part 72 refers to the intermediate feature information 233 indicating the feature amount for each of filters with respect to each of the input images 2, and classifies the input images 2, again (step S213). Then, the learning data selection part 73 select the represent sample in each of the classes as the learning data 232. After that, a process is conducted as described above, and explanation thereof will be omitted. The above described re-analysis process is repeated until the recognition rate becomes greater than the recognition rate threshold.

When the recognition rate is greater than the recognition rate threshold (YES of step S221), the generation part 210 terminates the generation process of the image processing algorithm 8*a*.

Figure 18:
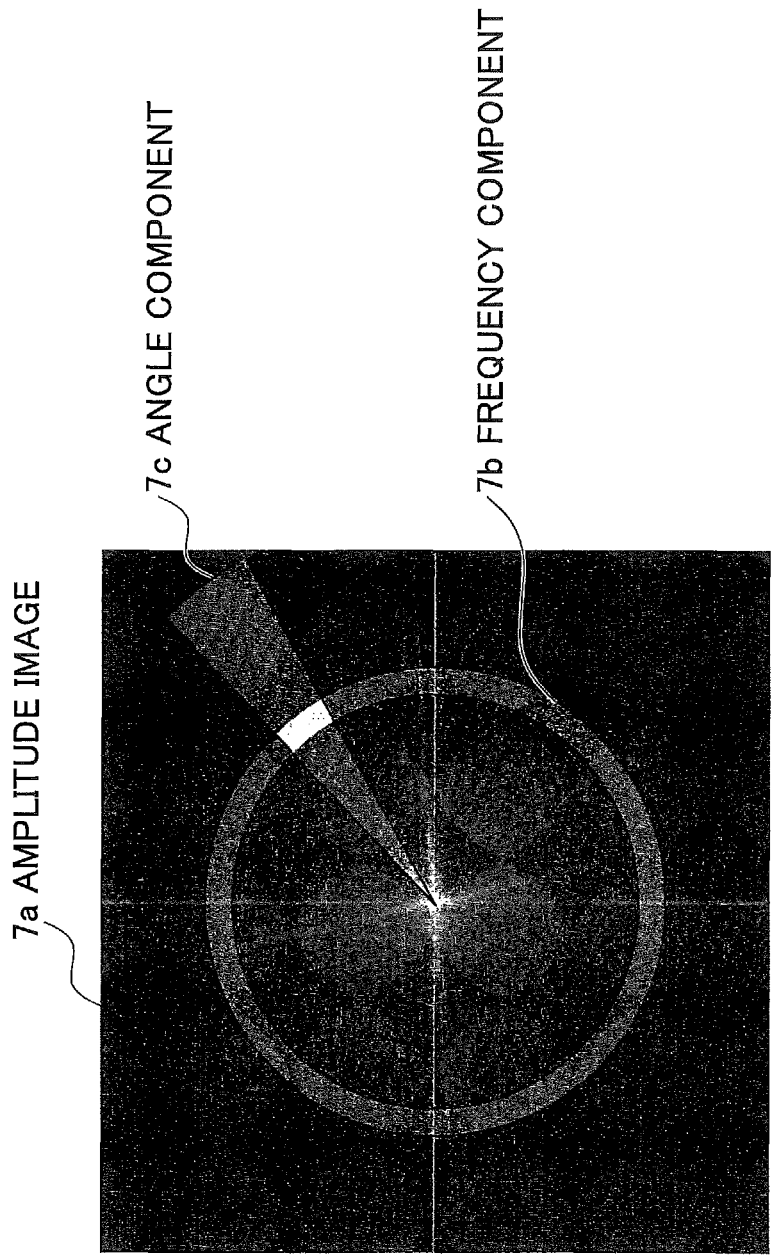
FIG. 18 is a diagram illustrating an amplitude image.

Next, the image feature amounts acquired by the feature analysis part 71 and the feature re-analysis part 76 are described with reference to FIG. 18, FIG. 19A, FIG. 19B, and FIG. 19C. FIG. 18 is a diagram illustrating an amplitude image 7*a*. The amplitude image 7*a* is regarded as an image acquired by conducting a two dimensional Fourier transform with respect to the input image 2.

The space frequency information includes a frequency component 7*b* and an angle component 7*c*. The frequency component 7*b* is acquired by dividing an area depending on a distance from the center of the amplitude image 7a. The feature amount of the frequency component 7b is represented by an amplitude average of divided areas. Also, the area is divided depending on an angle at the center of the amplitude image 7a. The feature amount of the angle component 7c is represented by an amplitude average of divided areas.

Figure 19A:
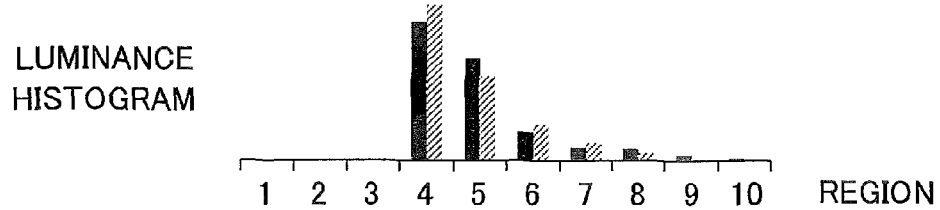
FIG. 19A, FIG. 19B, and FIG. 19C are diagrams illustrating examples of feature amounts.
Figure 19B:
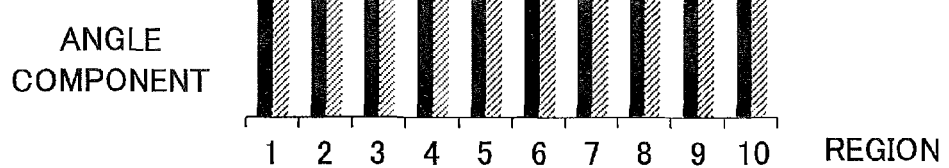
Figure 19C:
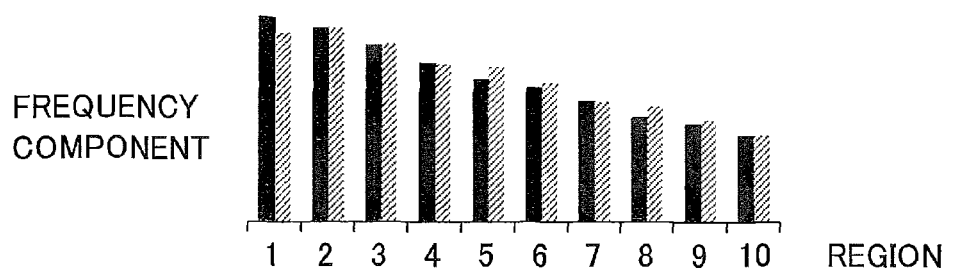

FIG. 19A, FIG. 19B, and FIG. 19C are diagrams illustrating examples of the feature amounts. FIG. 19A through FIG. 19C illustrate comparison examples of the feature amounts of two input images 2. FIG. 19A illustrates a luminance histogram. An average luminance is presented for each of 10 segments into which the input image 2 is divided, for each of the input images 2.

FIG. 19B illustrates the angle component. An amplitude average is presented for each of 10 segments into which the amplitude image 7a is divided based on the angle at the center of the amplitude image 7a. FIG. 19C illustrates the frequency component. A frequency average is presented for each of 10 segments into which the amplitude image 7a is divided depending on the distance from the center of the amplitude image 7a.

The luminance histogram, the angle component, and the frequency component are the parts of the multiple parameters. Each of the feature analysis part 71 and the feature re-analysis part 76 analyzes each of the input images 2 of the sample data 231 by dozens of types of the parameters.

Next, the parameters and a change example of the clustering during the evolutionary process will be described. FIG. 20A and FIG. 20B are diagrams illustrating initial feature information and a clustering example in the second embodiment. FIG. 20A illustrates the initial feature information of one input image 2 before the process of the image processing algorithm 8a. As the initial feature information, values of the parameters such as the average luminance, the luminance histogram, the angle component, the frequency component, and the like are stored. The average luminance is regarded as an average of the entire luminance of the input image 2. Values of the luminance histogram, the angle component, and the frequency component are indicated for each of the segments. The feature information is acquired for each of the input images 2 in the sample data 231.

FIG. 20B illustrates a result example of a main component analysis which the clustering part 72 conducts based on the initial feature information. This result example presents that the multiple input images in the sample data 231 are classified into eight sample groups G1, G2, G3, G4, G5, G6, G7, and G8. The number of the sample groups is not limited to eight groups, and may be arbitrarily set.

By using the above described clustering result, the learning data selection part 73 selects representative samples of the sample groups G1 through G8 as the learning data 232. In a case of the sample group G1, a source image G1r positioned around a center of the sample group G1 may be the representative sample. Other representative samples for the sample groups G2 through G8 may be selected in the same manner.

The automatic configuration part 74 updates the image processing algorithm 8a by the automatic configuration part 74 using the learning data 232 corresponding to initial learning data, and the filter verification part 75 verifies the image processing algorithm 8a (a first learning stage). It is assumed that it is determined that the feature re-analysis is preferably conducted. The feature re-analysis 76 acquires the feature amount for each of the multiple input images 2 in the sample data 231 which are source images, by the updated image processing algorithm 8a.

FIG. 21 is a diagram illustrating an example of the image processing algorithm 8a updated in the first learning stage in the second embodiment. In FIG. 21, the image processing algorithm 8a updated in the first learning stage includes filters F1, F2, F3, and F4. The output images 3 respective to the input images 2 are acquired by employing the image processing algorithm 8a.

A feature amount B1 is acquired after a process of the filter F1, and a feature amount B2 is acquired after a process of the filter F2. Also, a feature amount B3 is acquired after a process of the filter F3, and a feature amount B4 is acquired after a process of the filter F4. Then, the intermediate feature information 233 indicating the feature amounts B1 through B3 is stored in the storage part 230.

The image processing algorithm 8a is employed for all input images 2 in the sample data 231, and the feature amounts B1 through B3 are acquired by the filters F1 through F4.

Figure 22A:
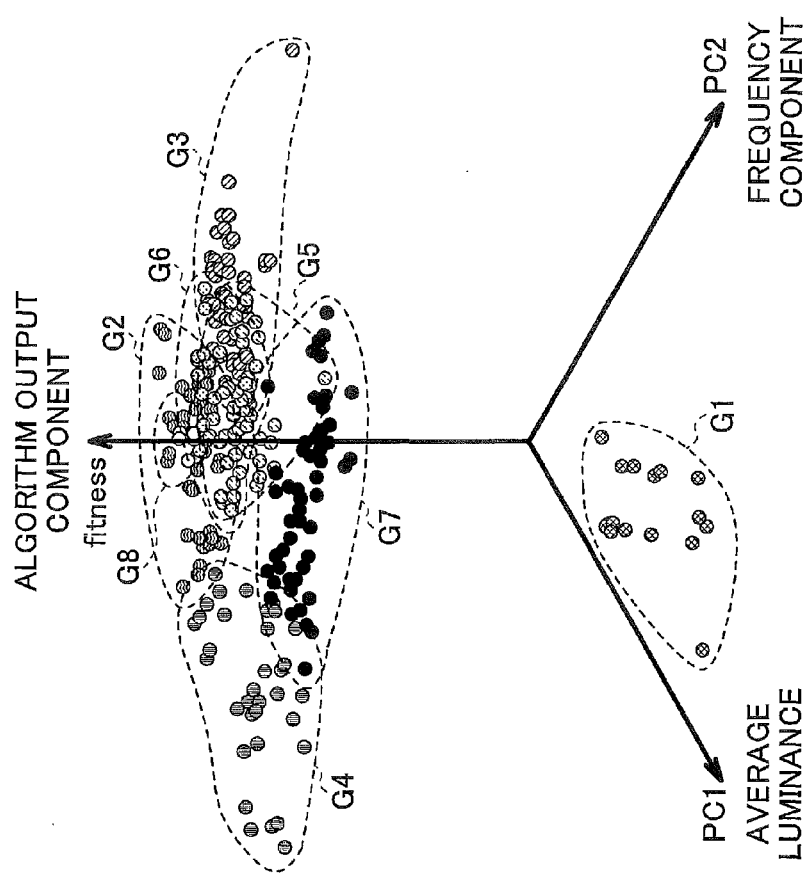
FIG. 22A and FIG. 22B are diagrams illustrating examples of the initial feature information and the clustering at the first learning stage in the second embodiment.
Figure 22B:
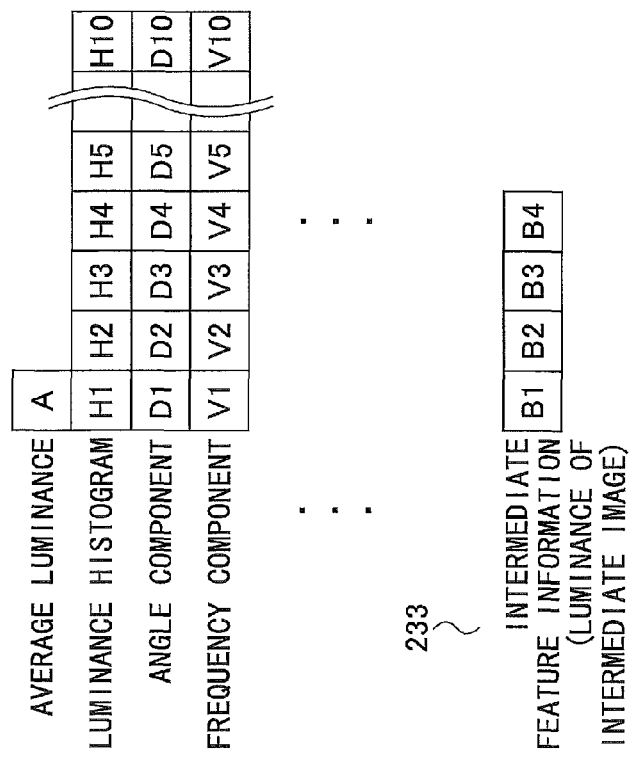

An example of the first learning stage will be described with reference to FIG. 22A and FIG. 22B. FIG. 22A and FIG. 22B are diagrams illustrating examples of the feature information and the clustering at the first learning stage in the second embodiment.

In FIG. 22A, in addition to the feature information of the input images 2, the intermediate feature information 233 acquired by the image processing algorithm 8a in FIG. 21 is illustrated. The feature amounts B1, B2, B3, and B4 of an intermediate image, which are acquired after the processes of the filters F1, F2, F3, and F4, are stored as the intermediate feature information 233. The feature amounts B1 through B4 may be the luminance of the intermediate image.

FIG. 22B illustrates a result of the clustering in the feature space by an algorithm output component of the image processing algorithm 8a, the average luminance, and the frequency component. In this example, as the algorithm output component, the intermediate feature information 233 is used.

In FIG. 22B, the sample group G1 at the bottom is a sample group in which the correspondence is significantly lower. That is, in the second embodiment, it is possible to conduct the clustering of the sample group to which the image processing algorithm 8a illustrated in FIG. 21 is weak.

As described above, the representative samples for the sample groups G1 through G8 are set as the learning data 232, and the image processing algorithm 8a is updated by the automatic configuration part 74. Then, the image processing algorithm 8a is verified by the filter verification part 75 (a second learning stage). The recognition rate becomes greater than or equal to the recognition threshold by the updated image processing algorithm 8a. The target image processing algorithm is acquired.

Figure 23:
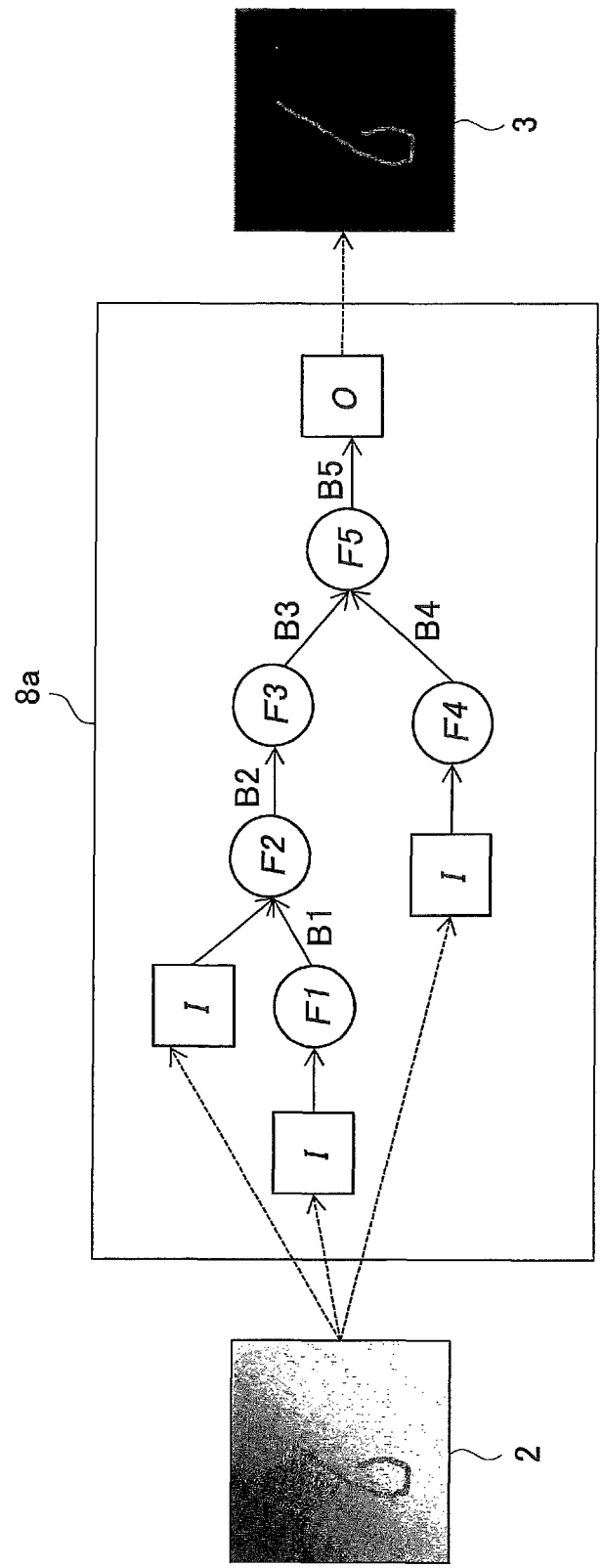
FIG. 23 is a diagram illustrating an example of the image processing algorithm updated at a second learning stage in the second embodiment.

FIG. 23 is a diagram illustrating an example of the image processing algorithm 8a updated in the second learning stage in the second embodiment. In FIG. 23, the image processing algorithm 8a updated at the second learning stage includes the filter F1, F2, F3, F4, and F5. The image processing algorithm 8a is regarded as the target image processing algorithm, and the generation process by the generation part 210 is terminated.

However, in the second embodiment, the feature re-analysis is conducted by the image processing algorithm 8a updated at this second learning stage. By the image processing algorithm 8a, the feature amount B1 is acquired after the process of the filter F1, and the feature amount B2 is acquired after the process of the filter F2. Also, the feature amount B3 is acquired after the process of the filter F3, and the feature amount B4 is acquired after the process of the filter F4. Moreover, the feature amount B5 is acquired after the process of the filter F5. The intermediate feature information 233 indicating the feature amounts B1 through B5 is stored in the storage part 230.

Figure 24A:
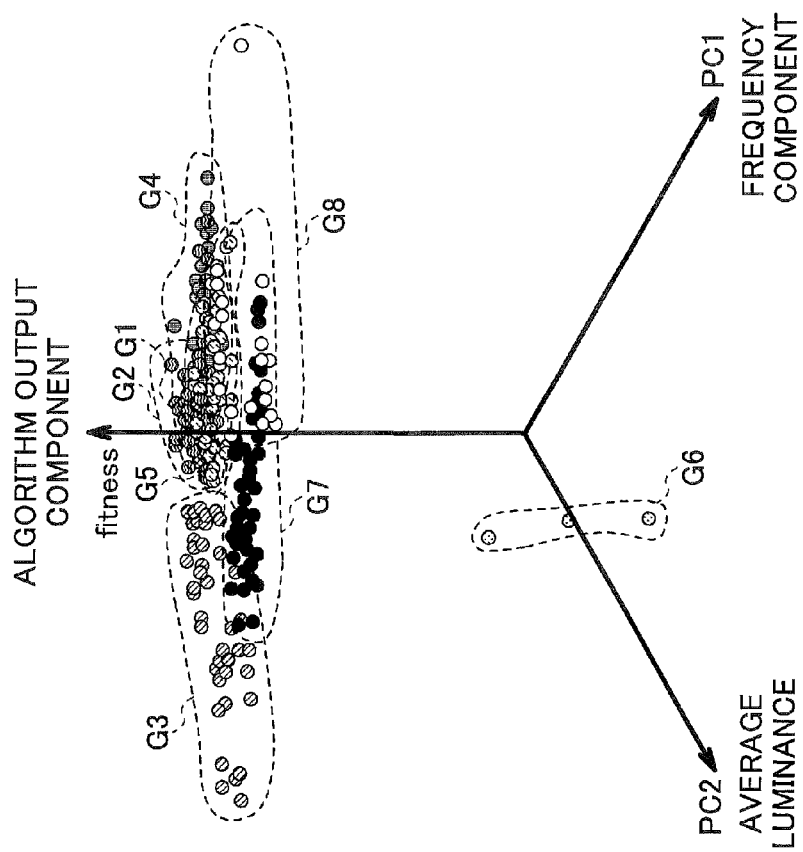
FIG. 24A and FIG. 24B are diagrams illustrating examples of the feature information and the clustering in a target image processing algorithm in the second embodiment.
Figure 24B:
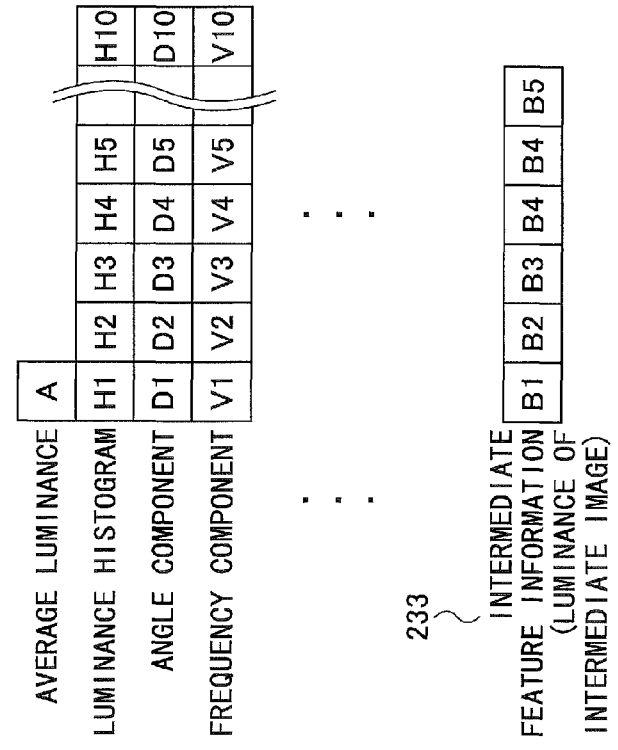

FIG. 24A and FIG. 24B are diagrams illustrating examples of the feature information and the clustering in the target image processing algorithm in the second embodiment.

FIG. 24A illustrates an example of the intermediate feature information 233 acquired by the image processing algorithm 8a in FIG. 23 in addition to the feature information of the input images 2. The feature amounts B1, B2, B3, B4, and B5 acquired after the processes of the filter F1, F2, F3, F4, and F5, respectively, are stored as the intermediate feature information 233. The feature amounts B1 through B5 indicate luminance of respective intermediate images.

FIG. 24B illustrates a result from conducting the clustering in the feature space of the output component of the image processing algorithm 8a, the average luminance, and the frequency component. In this example, the intermediate feature information 233 is used as the output component of the image processing algorithm 8a.

In FIG. 24B, the sample groups G1 to G5, G7, and G8 are positioned almost together at top in the feature space. There is the sample group G6 which is prominently positioned at bottom. However, there are fewer input images 2 classified into the sample group G6.

As described above, it is possible to precisely acquire the output images 3 for any of the input images 2 in the sample data 231 by the image processing algorithm 8a generated in the second embodiment.

Figure 25:
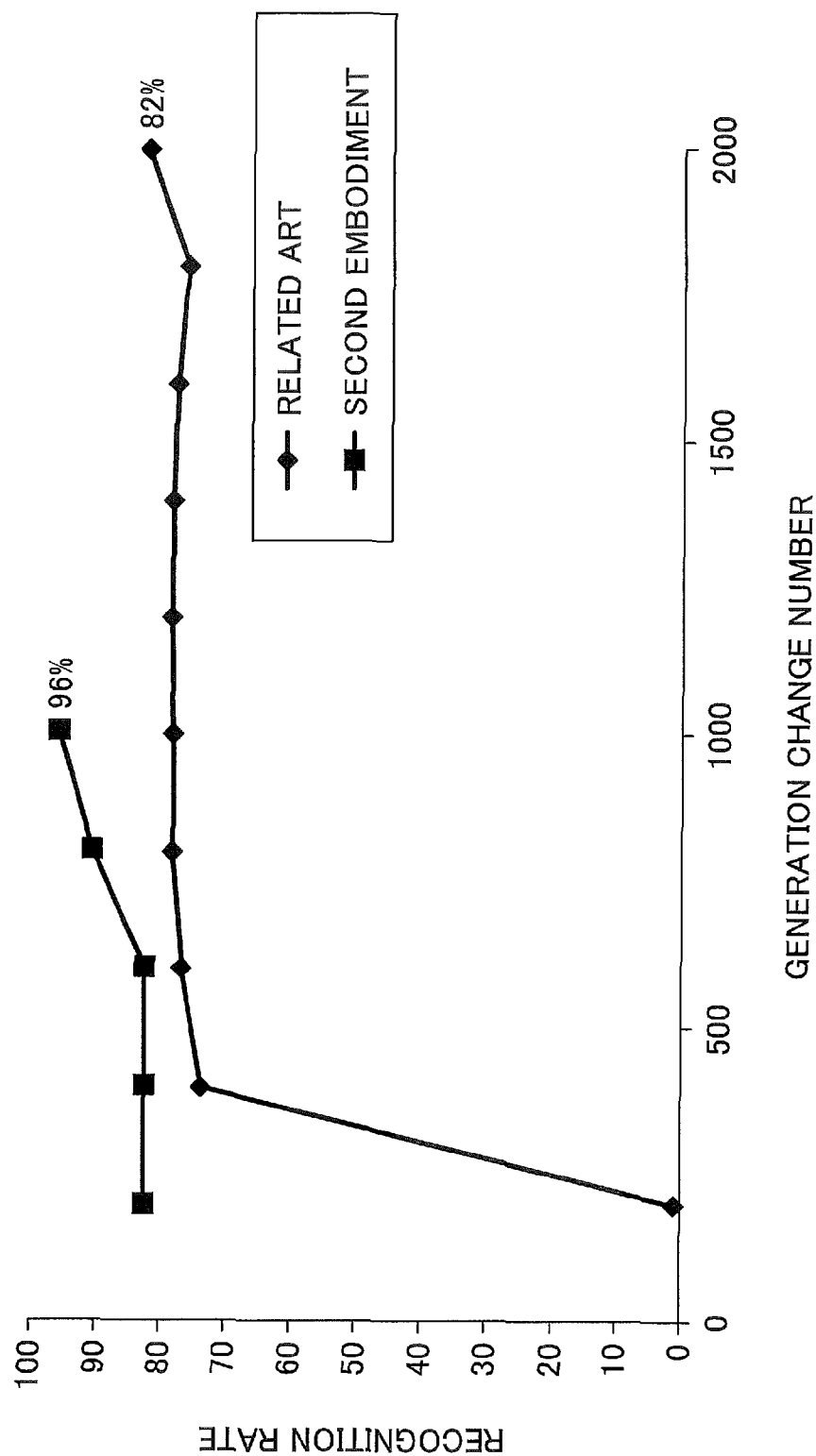
FIG. 25 is a diagram illustrating a transition of a recognition rate of the image processing algorithm representing a maximum fitness in the second embodiment.

FIG. 25 is a diagram illustrating a transition of the recognition rate of the image processing algorithm 8a representing the maximum fitness in the second embodiment. Referring to a graph depicted in FIG. 25, the transition of the recognition rate of the related art, in which the second embodiment is not applied, is illustrated to compare with the second embodiment.

The related art in which the second embodiment is not applied corresponds to a technology in which a user arbitrarily selects the learning data 232 from the sample data 231, and the image processing algorithm 8a is generated by the evolutionary process using the genetic programming by using the learning data 232 which are selected by the user.

In the second embodiment, the representative samples of the sample groups G1 through G8 are acquired by conducting the clustering for the sample data 231, and are included in the learning data 232. It is possible to cyclopaedically learn the entire features of the multiple input images 2 included in the sample data 231. Hence, it is possible to generate the image processing algorithm 8a being highly versatile, and to reduce a case of the image processing in which a feature of the output image 3e as illustrated in FIG. 14 is not detected.

In a case of applying the second embodiment, it is possible to present a higher recognition rate from an initial stage. Hence, in the second embodiment, it is possible to realize high speed learning.

As described above, in the second embodiment, by selecting the learning data 232 cyclopaedically learning the image feature of the application destination and conducting re-learning, it is possible to efficiently search for the image processing algorithm 8a which is a target algorithm and has an excellent performance. In addition, it is possible to improve a learning speed and learning accuracy.

Accordingly, it is possible to efficiently search for the filter structure pertinent to the image processing with respect to one or more target images 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
   a processor configured to perform a process that arranges multiple image filters in a tree structure hierarchized by an order of an image emphasis process, a threshold process, and a binary image processing and acquires features of multiple input images captured in different environments; and
   a storage part configured to store a filter table that maintains the multiple image filters, each of which is associated with a property indicating one of the image emphasis process, the threshold process, and the binary image processing, and a depth of a node restricted by the property,
   wherein the process includes
   selecting, by referring to the filter table, one or more image filters within a depth restricted to a layer for each of layers;
   generating a population that includes the multiple image filters being selected in the tree structure; and
   conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

2. The image processing apparatus as claimed in claim 1, wherein the generating of the population generates the population, in which the multiple image filters are arranged in the tree structure, by using genetic programming.

3. The image processing apparatus as claimed in claim 2, wherein the generating of the population arranges the multiple image filters in the tree structure in which a target image is set as a root, and selects the input images to an end node in a predetermined layer.

4. A feature detection method performed by a computer, the method comprising:
   performing, by the computer, a feature detection process for arranging multiple image filters in a tree structure hierarchized by an order of an image emphasis process, a threshold process, and a binary image processing, and acquiring features of multiple input images captured in different environments,
   wherein the feature detection process includes
   selecting one or more image filters within a depth restricted to a layer for each of layers by referring to a filter table stored in a storage part, the filter table maintaining the multiple image filters, each of which is associated with a property indicating one of the image emphasis process, the threshold process, and the binary image processing, and a depth of a node restricted by the property;

generating a population that includes the multiple image filters being selected in the tree structure; and conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

5. A non-transitory computer-readable recording medium storing a program which, when executed by a computer, causes the computer to perform a feature detection process for arranging multiple image filters in a tree structure hierarchized by an order of an image emphasis process, a threshold process, and a binary image processing, and acquiring features of multiple input images captured in different environments, the feature detection process comprising:

selecting one or more image filters within a depth restricted to a layer for each of layers by referring to a filter table stored in a storage part, the filter table maintaining the multiple image filters, each of which is associated with a property indicating one of the image emphasis process, the threshold process, and the binary image processing, and a depth of a node restricted by the property;

generating a population that includes the multiple image filters being selected in the tree structure; and conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

6. An image processing apparatus for executing a process program, in which multiple filters are formed in a tree structure, with respect to multiple input images captured by an imaging device, the apparatus comprising:

a processor configured to perform a process that arranges multiple image filters in a tree structure hierarchized by an order of an image emphasis process, a threshold process, and a binary image processing and acquires features of multiple input images captured in different environments; and a storage part configured to store a filter table that maintains the multiple image filters, each of which is associated with a property indicating one of the image emphasis process, the threshold process, and the binary image processing, and a depth of a node restricted by the property, wherein the process includes
classifying the multiple input images into clusters based on feature amounts concerning the multiple images at an initial learning stage;
selecting a representative image close to a center of the feature amounts for each of the clusters; and
generating the process program through learning employing genetic programming by using learning data, which include multiple representative images selected for the clusters, wherein the generating of the process program further includes
selecting, by referring to the filter table, one or more image filters within a depth restricted to a layer for each of layers;
generating a population that includes the multiple image filters being selected in the tree structure; and
conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

7. The image processing apparatus as claimed in claim 6, wherein the feature amounts are acquired based on an average luminance, a luminance histogram, and space frequency information for each of the multiple images.

8. The image processing apparatus as claimed in claim 6, wherein during a learning process using the genetic programming, the feature amounts are calculated by the process program of the tree structure in middle of generation, and the learning data is re-selected.

9. The image processing apparatus as claimed in claim 8, wherein the average luminance is acquired as the feature amount from each of the filters forming the process program of the tree structure.

10. The image processing apparatus as claimed in claim 6, wherein clustering is performed based on the feature amounts with respect to the learning data, representative samples are selected respectively from sample groups, and the learning data is updated.

11. An image processing method performed in a computer, the method comprising:

performing, by the computer, a feature detection process for arranging multiple image filters in a tree structure hierarchized by an order of an image emphasis process, a threshold process, and a binary image processing, and acquiring features of multiple input images captured in different environments, wherein the feature detection process includes
classifying the multiple input images into clusters based on feature amounts concerning the multiple images at an initial learning stage;
selecting a representative image close to a center of the feature amounts for each of the clusters; and
generating the process program through learning employing genetic programming by using learning data, which include multiple representative images selected for the clusters, wherein the generating of the process program further includes
selecting one or more image filters within a depth restricted to a layer for each of layers by referring to a filter table stored in a storage part, the filter table maintaining the multiple image filters, each of which is associated with a property indicating one of the image emphasis process, the threshold process, and the binary image processing, and a depth of a node restricted by the property;
generating a population that includes the multiple image filters being selected in the tree structure; and
conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

12. A non-transitory computer-readable recording medium storing a program which, when executed by a computer, causes the computer to perform a feature detection process for arranging multiple image filters in a tree structure hierarchized by an order of an image emphasis process, a threshold process, and a binary image processing, and acquiring features of multiple input images captured in different environments, the feature detection process comprising:

classifying the multiple input images into clusters based on feature amounts concerning the multiple images at an initial learning stage;

selecting a representative image close to a center of the feature amounts for each of the clusters; and generating the process program through learning employing genetic programming by using learning data, which include multiple representative images selected for the clusters, wherein the generating of the process program further includes selecting one or more image filters within a depth restricted to a layer for each of layers by referring to a filter table stored in a storage part, the filter table maintaining the multiple image filters, each of which is associated with a property indicating one of the image emphasis process, the threshold process, and the binary image processing, and a depth of a node restricted by the property;

generating a population that includes the multiple image filters being selected in the tree structure; and conducting an evolutionary process using genetic programming, in which a crossover process is conducted with respect to the population based on a first restriction rule of a crossover pair, which restricts selection of the crossover pair for each of the layers, and a mutation process is conducted with respect to the population based on a second restriction rule of mutation, which restricts types of the mutation for each of the layers.

* * * * *